United States Patent
Bellerjeau et al.

(10) Patent No.: US 12,470,902 B2
(45) Date of Patent: Nov. 11, 2025

(54) EMERGENCY ASSISTANCE VIA A WI-FI MESH

(71) Applicant: DISH Network L.L.C., Englewood, CO (US)

(72) Inventors: Amber Bellerjeau, Littleton, CO (US); Caroline Elizabeth Condon, Denver, CO (US); Luke VanDuyn, Conifer, CO (US)

(73) Assignee: DISH Network L.L.C., Englewood, CO (US)

( * ) Notice: Subject to any disclaimer, the term of this patent is extended or adjusted under 35 U.S.C. 154(b) by 544 days.

(21) Appl. No.: 17/877,736

(22) Filed: Jul. 29, 2022

(65) Prior Publication Data

US 2024/0040356 A1 Feb. 1, 2024

(51) Int. Cl.
| | |
|---|---|
| *H04W 4/80* | (2018.01) |
| *G08B 7/06* | (2006.01) |
| *H04W 4/029* | (2018.01) |
| *H04W 4/33* | (2018.01) |
| *H04W 4/90* | (2018.01) |
| *H04W 84/12* | (2009.01) |

(52) U.S. Cl.
CPC .............. *H04W 4/80* (2018.02); *G08B 7/066* (2013.01); *H04W 4/029* (2018.02); *H04W 4/33* (2018.02); *H04W 4/90* (2018.02); *H04W 84/12* (2013.01)

(58) Field of Classification Search
CPC ......... H04W 4/80; H04W 4/33; H04W 4/029; H04W 4/90; H04W 84/12; G08B 7/066
See application file for complete search history.

(56) References Cited

U.S. PATENT DOCUMENTS

| | | | | |
|---|---|---|---|---|
| 6,317,042 | B1* | 11/2001 | Engelhorn | G08B 25/14 340/288 |
| 8,315,636 | B2* | 11/2012 | Moon | H04W 40/20 455/446 |
| 9,955,297 | B2* | 4/2018 | Kostka | G06Q 30/0267 |
| 11,102,637 | B2 | 8/2021 | Beemer et al. | |
| 11,157,086 | B2 | 10/2021 | Cipoletta et al. | |

(Continued)

OTHER PUBLICATIONS

U.S. Appl. No. 17/891,830, Non-final Office Action, Sep. 18, 2024 (Available at USPTO Patent Center).

(Continued)

*Primary Examiner* — Thomas D Alunkal
(74) *Attorney, Agent, or Firm* — Wash Park IP Ltd.; John T. Kennedy

(57) ABSTRACT

A process may include detecting an incident within a building, determining a first radius of a user device from a node by wirelessly coupling the user device and the node, determining the first radius based on a signal property of the coupling; determining a second radius of the user device from a second node by wireless coupling the user device and the second node and based on a signal property of the second coupling; determining a third radius of the user device from a third node by wireless coupling the user device and the third node, and based on a third signal property of the coupling; and first calculating, based on the first radius, the second radius, and the third radius, a current location of the first user device within the building. The first node may be a node for a Wi-Fi mesh system.

17 Claims, 14 Drawing Sheets

(56) References Cited

U.S. PATENT DOCUMENTS

| | | | | |
|---|---|---|---|---|
| 11,625,995 | B2* | 4/2023 | Derickson | G06Q 90/205 |
| | | | | 340/691.6 |
| 11,930,380 | B2 | 3/2024 | Sakamoto et al. | |
| 2015/0327010 | A1 | 11/2015 | Gottschalk et al. | |
| 2016/0302079 | A1 | 10/2016 | Chari et al. | |
| 2017/0032632 | A1* | 2/2017 | Joseph | H04W 4/90 |
| 2017/0109981 | A1* | 4/2017 | Joseph | G08B 7/066 |
| 2017/0270481 | A1* | 9/2017 | Morgenthau | H04W 4/80 |
| 2018/0143601 | A1* | 5/2018 | Chavan | G05B 15/02 |
| 2018/0365785 | A1 | 12/2018 | Boss et al. | |
| 2019/0102488 | A1 | 4/2019 | Santarone et al. | |
| 2020/0202117 | A1 | 6/2020 | Wu et al. | |
| 2021/0352462 | A1 | 11/2021 | Beemer et al. | |
| 2024/0064489 | A1 | 2/2024 | Condon | |

OTHER PUBLICATIONS

U.S. Appl. No. 17/380,223, filed Jul. 20, 2021.
U.S. Appl. No. 17/953,614, Notice of Allowance, Mar. 30, 2023.
U.S. Appl. No. 17/877,736, filed Jul. 29, 2022, Amber Bellerjeau.
U.S. Appl. No. 17/891,830, filed Aug. 19, 2022, Caroline Elizabeth Condon.
U.S. Appl. No. 17/953,614, filed Sep. 27, 2022, Houston Beemer.
"Choosing Your Motion Detection Devices—Plume Help," Plume Inc. 2022, downloaded from the Internet on May 4, 2022 from https://support.plume.com/hc/en-us/articles/360043393453-Choosing-your-Motion-Detection-Devices-.
"What devices are eligible or detecting motion?" Plume Design Inc., 2022, as downloaded from the Internet on May 4, 2022 from https://support.plume.com/hc/en-us/articles/360043364893-What-devices-are-eligible-for-detecting-motion.
"What is Sense?" Plume Design Inc., 2022, as downloaded from the Internet on May 4, 2022 from https://support.plume/com/hc/en-us/articles/360042635193-What-is-Sense-.
"Why is there no Sense coverage in a room where I have a Wi-Fi connection?" Plume Design Inc., 2022, as downloaded from the Internet on May 4, 2022 from https://support.plume.com/hc/en-us/articles/360043658413-why-is-there-no-Sense-coverage-in-a-room-where-I-have-a-wi-fi-connection-.
Delaney, John R., PC Magazine, Jul. 27, 2021, "Plume SuperPod With Wi-Fi 6 Review," as downloaded from the Internet on May 4, 2022 from: https://www.pcmag.com/reviews/plume-superpod-with-wi-fi-6.
HomePass, "How do I access my home's motion history?", Plume Design Inc., as downloaded from the Internet on May 4, 2022 from https://support.plume/com/hc/en-us/articles/360042906154.
Salter, Jim, Mar. 3, 2020, "From Wi-Fi to Spy-Fi—we test Plume's new motion detection featue |Ars Technica," as downloaded from the Internet on May 4, 2022 from https://artechnica.com/gadgets/2022/03/from-wi-fi-to-spy-fi-we-test-plumes-new-motion-detection-feature/.
U.S. Appl. No. 16/568,019, Full Prosecution History.
U.S. Appl. No. 17/380,223, Full Prosecution History to date.
U.S. Appl. No. 17/380,223, Non-final Office Action, Mar. 2, 2023.
U.S. Appl. No. 17/877,736, filed Jul. 29, 2022.
U.S. Appl. No. 17/891,830, filed Aug. 19, 2022.
U.S. Appl. No. 17/953,614, filed Sep. 27, 2022.
U.S. Appl. No. 17/953,614, non-final Office Action, Mar. 2, 2023.
U.S. Appl. No. 17/953,614, response to non-final Office Action and e-Terminal Disclaimer, Mar. 10, 2023.
"Chapter 7", downloaded from the Internet on Oct. 21, 2020, from http://aturing.umcs.maine.edu/ meadow/courses/cos335/COA07.pdf.
"CSCI 4717", downloaded from the Internet on Oct. 21, 2020 from https://faculty.etsu.edu/tarnoff/ntes4717/week_06/IO.ppt, and converted into PDF form.
"Lecture 19", downloaded from the Internet on Oct. 21, 2020, from http://www.ecs.csun.edu/ cputnam/Comp546/Input-Output-Web.pdf.
U.S. Appl. No. 17/891,830, Response to Non-final Office Action, Dec. 18, 2024 (Available at USPTO Patent Center).
U.S. Appl. No. 17/891,830, Notice of Allowance, May 5, 2025 (Available at USPTO Patent Center).
U.S. Appl. No. 19/170,676, filed Apr. 4, 2025 (Available at USPTO Patent Center).
U.S. Appl. No. 17/891,830, Notice of Allowance Jan. 16, 2025 (Available at USPTO Patent Center).

* cited by examiner

EMERGENCY ASSISTANCE VIA A WI-FI MESH

TECHNICAL FIELD

The technology described herein generally relates to devices, systems, and processes for providing one or more persons located at or near an incident location with relevant real-time information regarding egress routes, incident conditions, and the like. The technology also generally relates to providing first responders, such as fire, police, ambulance, and others, with information regarding location and condition of one or more users at or near an incident location, the egress routes, and other information.

The technology described also generally relates to determining a location of a user using wireless signaling technologies. The various implementations disclosed generally relate to utilizing one or more devices, systems, and processes for detecting location of a user in a given incident environment based on multiple wireless signal properties.

BACKGROUND

Today, a person (herein a "user") may be exposed to a life threatening and/or injurious incident, such as a fire, natural disaster, terrorism incident, or otherwise. Often a user may not know or be aware of (e.g., due to smoke, fire, or otherwise) a primary egress route and/or alternative egress routes from their current location to a safer location. For example, multiple egress routes from a given location within a building in which an incident is occurring (e.g., a building structure fire) may exist with one or more egress routes being primary and other alternative egress routes being available. Often an alternative egress route may become a primary egress route due to the location or spreading of the incident, structural concerns, congestion of a given egress route, or otherwise. A user may not be aware of such primary and/or alternative egress routes. Accordingly, devices, systems and processes for notifying a user of primary and alternative egress routes are needed. Further, following a given egress route may be difficult under various incident conditions. For example, dense smoke may inhibit the identification of an egress route by a given user. Accordingly, user specific evacuation directions are needed, where such evacuation directions identify a specified egress route, for a given user, at a given time.

Further, users commonly may not be informed of a nature of a given incident. For example, a user may not know which portions of a building are engulfed in a fire, obstructed, under-going renovation, or the like. Accordingly, devices, systems and processes are needed for informing a given user of current conditions relevant to their current location, egress route, incident location, and the like. Implementations providing user specific information, tailored to the user, is needed.

Likewise, first responders are commonly ill-informed of a number of users at a given incident location, the location of users, user characteristics (e.g., mobility challenged, minors, seniors, or the like), egress routes for the users, and the like. Accordingly, implementations are needed which inform first responders of egress routes being utilized by one or more users and information regarding such users. Such an implementation may increase the efficiency at which first responders can assist users in egress from an incident location or taking other actions.

Further, location determination mechanisms used today to identify a user's location commonly rely on Global Positioning System (GPS) technologies, cellular triangulation technologies, or the like. Such systems often lack precise positional accuracy determination in many potential incident locations, such as inside buildings, due to resolution constraints (e.g., GPS positional accuracy determinations may be limited by law or regulation), signaling characteristics such as walls, electromagnetic signal interference sources, jamming, or other "interferences" reducing and/or eliminating reliance on cellular and GPS technologies for a "precision location determination" of a given user, which is herein defined as the determination of a current and real-time location of a given user, in a given environment, with less than one meter (1 m) of positional error.

The various implementations described herein provide devices, systems and processes which address the above and other concerns.

SUMMARY

In accordance with at least one implementation of the present disclosure a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

For at least one implementation, a process may include detecting an incident within a building; first determining a first radius of a first user device from a first node by: establishing a first wireless coupling between the first user device and the first node, and determining the first radius based on a first signal property of the first wireless coupling. The process may also include second determining a second radius of the first user device from a second node by: establishing a second wireless coupling between the first user device and the second node, and determining the second radius based on a second signal property of the second wireless coupling. The process may also include third determining a third radius of the first user device from a third node by: establishing a third wireless coupling between the first user device and the third node, and determining the third radius based on a third signal property of the second wireless coupling. The process may also include first calculating, based on the first radius, the second radius, and the third radius, a current location of the first user device within the building. Other implementations may include corresponding computer systems, apparatus, and computer programs recorded on one or more computer storage devices, each configured to perform one or more of the operations.

Implementations may include one or more of the following features. The first node may be a first mesh node of a Wi-Fi mesh system. The first wireless coupling may be a Wi-Fi coupling. The first signal property may be a received signal strength, by the first user device, of the first wireless coupling. The fourth wireless coupling may be a BLUETOOTH coupling. The first node, the second node, and the third node may be located within the building and coupled to a hub that may be further coupled to at least one monitoring device configured to detect the incident. The first signal property may be a first time delay between one of: a first sending time and a first receipt time; where the first sending time indicates when the first node sent a first ranging signal. The first receipt time may indicate when the first user device received the first ranging signal. A first reply time and a first reply receiving time may indicate when the first user device respectively sent and received the first reply. The first node may be a first mesh node of a Wi-Fi mesh system. The second node may be a second mesh node of the Wi-Fi mesh system. The third node may be a third mesh node of the Wi-Fi mesh system. The Wi-Fi communications signals may be utilized for the first wireless coupling, the second wireless coupling, and/or the third wireless coupling. The calculating of the current location of the user device may be performed by a hub coupled to the user device, the first node, the second node, and/or the third node. The calculating of the current location of the user device may be performed by the user device.

The process may also include generating a first egress route portion based on the current location of the user device and an incident location, and outputting the first egress route portion in a humanly perceptible format and for presentation to a user of the first user device. The process may include second calculating a second location of the user device, generating a second egress portion based on the second location of the user device and the incident location, and outputting the second egress portion in a humanly perceptible format and for presentation to the user of the first user device. The first egress route portion may include turn-by-turn directions for the user to progress from the current location to an egress location within the building. The first egress route portion may be generated based on real-time data received from at least one monitoring device located within the building. Implementations of the described techniques may include hardware, a method or process, or computer software on a computer-accessible medium.

For at least one implementation, a user device also includes a processor; a data store, coupled to the processor. The data store non-transiently stores computer instructions, which upon execution by the processor, instantiate a location engine. The user device may also include a communication interface coupled to at least the processor. The location engine may be instantiated when the processor receives an indication of an incident within a building. While the location engine is instantiated, the user device may determine a current location of the user device within the building by: first determining a first signal property of a first Wi-Fi coupling established between the user device and a first mesh node; second determining a second signal property of a second Wi-Fi coupling established between the user device and a second mesh node; third determining a third signal property of a third Wi-Fi coupling established between the user device and a third mesh node; and first calculating, based on the first signal property, the second signal property, and the third signal property, the current location of the user device within the building.

The first mesh node, the second mesh node, and the third mesh node form a mesh system within the building. Other implementations may include corresponding computer systems, apparatus, and computer programs recorded on one or more computer storage devices, each configured to perform the actions of the methods.

Implementations may include one or more of the following features. The first signal property may be a received signal strength, by the user device, for the first Wi-Fi coupling. The current location of the user device within the building may be determined by: first determining a first distance of the user device from the first mesh node by: establishing the first Wi-Fi coupling between the user device and the first mesh node; and determining the first distance based on the first signal property of the first Wi-Fi coupling; second determining a second distance of the user device from the second mesh node by: establishing the second Wi-Fi coupling between the user device and the second mesh node; and determining the second distance based on the second signal property of the second Wi-Fi coupling; third determining a third distance of the user device from the third mesh node by: establishing the third wireless coupling between the user device and the third mesh node; and determining the third distance based on the third signal property of the third wireless coupling; and second calculating, based on the first distance, the second distance, and the third distance, the current location of the user device within the building. The first distance may be a first radius of a first ranging signal transmitted by the first mesh node upon a detection of the incident by a hub coupled to the mesh system; where the second distance may be a second radius of a second ranging signal transmitted by the second mesh node upon the detection of the incident by the monitor; where the third distance may be a third radius of a third ranging signal transmitted by the third mesh node upon the detection of the incident by the monitor; and where the first calculating of the current location further may include triangulation of the first radius, the second radius, and the third radius. While the location engine is instantiated, the user device may further determine the current location of the user device within the building by: establishing a fourth wireless coupling between the user device and a local device coupled to the mesh system; and determining a fourth distance based on a fourth signal property of the fourth wireless coupling. The fourth wireless coupling may be a BLUETOOTH coupling. Implementations of the described techniques may include hardware, a method or process, or computer software on a computer-accessible medium.

For at least one implementation, the user device includes a processor; a data store, coupled to the processor which non-transiently stores computer instructions, which upon execution by the processor, instantiate an egress engine. The device may also include a communications interface coupled to at least the processor. The egress engine may be instantiated when the processor receives an indication of an incident within a building; and while the egress engine may be instantiated, the user device may determine a first egress route portion from a first user location for the user device within the building by: receiving first user location data from a location engine instantiated by the processor; where the first user location data may be determined by the location engine based on signal properties of Wi-Fi wireless couplings of the user device with at least three nodes of a Wi-Fi mesh system. The device may also receive first real-time data including: a first incident location data identifying an incident location for an incident, a first incident type data for the incident, first building structural data, and a first egress location data identifying a first egress location. The device may determine the first egress route portion in view of the first user location data, the first incident location data, the first incident type data, the first building structural data, and the first egress location data. The first egress route portion may avoid the incident location while providing an egress route from the first user location to the first egress location. Other embodiments of this aspect include corresponding computer systems, apparatus, and computer programs recorded on one or more computer storage devices, each configured to perform the actions of the methods.

Implementations may include one or more of the following features. While the egress engine may be instantiated, the user device may determine a second egress route portion from a second user location to at least one of the first egress location and a second egress location when the incident has progressed from the incident location to a second incident location. The first egress route portion may be provided to a responder device communicatively coupled to the Wi-Fi mesh system. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1A:
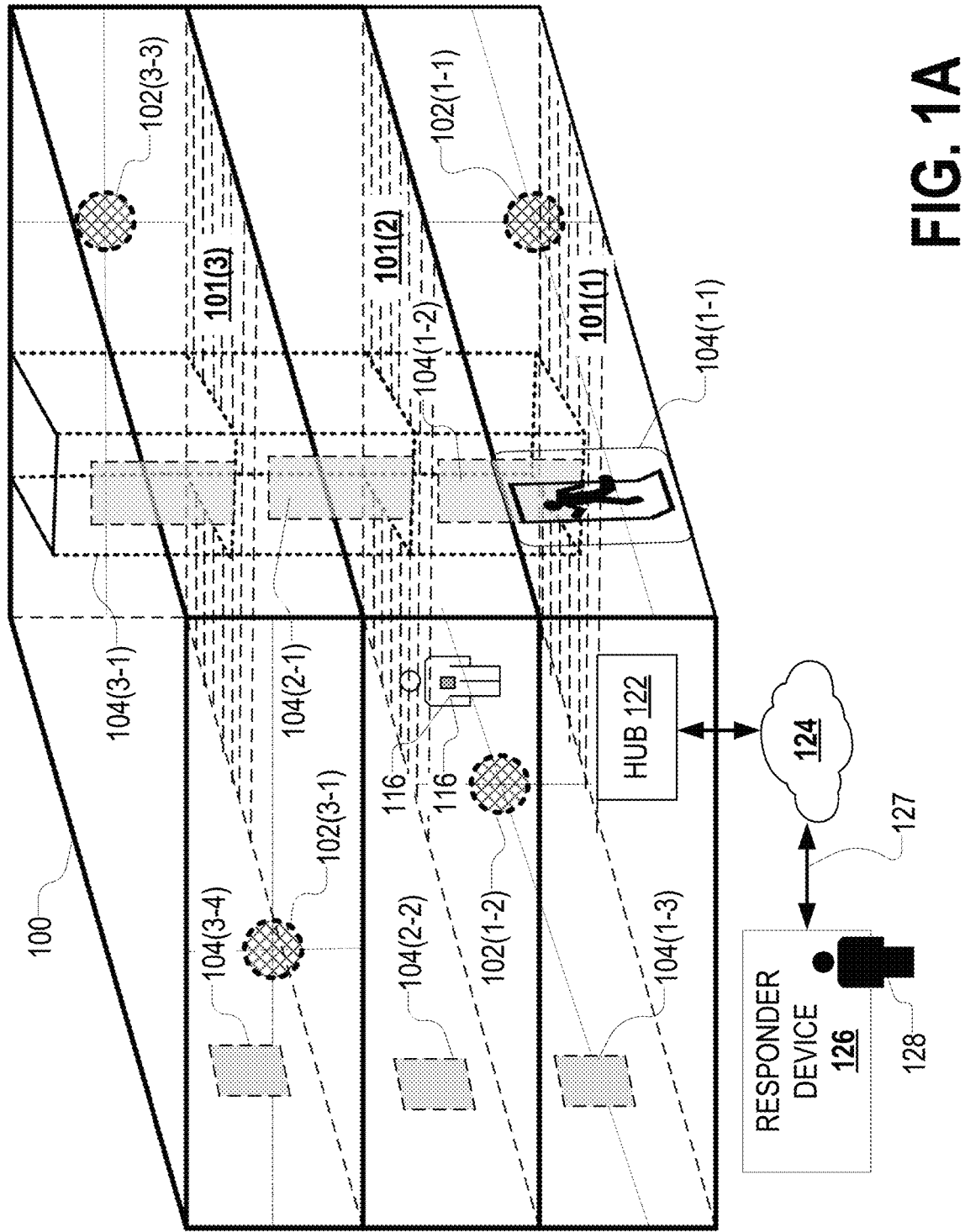
FIG. 1A is a schematic representation of a building that includes multi-mesh connected nodes and in accordance with at least one implementation of the present disclosure.

The various implementations described herein are directed to devices, systems, and processes for users with relevant, real-time locational and situational information regarding an incident. Such information may include one or more egress routes, details about an activity or event (herein, an "incident"). The incident may be any activity or event with respect to which one or more users are to be directed from a given location to another location. The given location may arise at any physical place within or external to a structure. Herein, a given location is illustratively and non-limiting represented and referred to as a "building." The given location may include a current location for a given user, a future location for the given user (e.g., as represented by a calendar entry), or otherwise.

The incident may present a current or later arising concern with respect to the safety of one or more users, which may include the given user. As used herein, an "incident" may include, but is not limited to, any event to which a response by a responder (as further defined below) may be requested. The incident may relate to and/or concern a public or private activity, a private or public building, or otherwise. Non-limiting examples of incidents may include natural disasters (e.g., tornados, hurricanes, sandstorms, blizzards, or the like), fires (e.g., structure fires, forest fires, wildland fires, or the like), human caused incidents (e.g., shootings, terrorism incidents, protests, parades, marches or the like), or other events with respect to which one or more users are to be instructed to transit from a given current location to another location (e.g., a Presidential visit to a location resulting in an evacuation of a building while the visit occurs), or otherwise.

One or more of the various implementations facilitate precision location determinations of a given user. Implementations may include use of one or more combinations of Wi-Fi nodes to generate the precision location determination. It is to be appreciated that principles of triangulation, Doppler effects, signal strength characteristics, and the like may be used to facilitate precision location determination for the given user, at a given time.

One or more of the various implementations may utilize, separately and/or in conjunction with one or more Wi-Fi nodes, other wireless communications technologies with other local devices to facilitate precision location determinations for a given user at a given time. Non-limiting examples of such other wireless communications technologies include BLUETOOTH, Near-Field Communications (NFC), cellular communications, Z-WAVE, and the like.

Various implementations may also provide routing information and other information to the given user which informs the given user on one or more egress routes from a then arising current location within the building to one or more safe locations. Such safe locations may be within or external to the building.

Various implementation may provide first-responders and/or others with information regarding the location of a given user, additional information relevant to such given user in view of the incident, and otherwise. For example, and not by limitation, additional information may include information identifying the given user as being mobility challenged, disabled, or the like. Such additional information may be useful by a first responder to identify a priority for response to the given user, when a population of users are to egress the building or otherwise proceed to a safe location in view of the given location. Herein, the procession of a user from a current location to another directed location, in view of a given incident, is referred to as an "egress." It is to be appreciated that for a given incident, an egress may include an action of not moving and sheltering in place. For example, a given user in a building with respect to which a tornado is approaching may already be located within a safe location within the building. Under such circumstances, evacuation or egress instructions for that given user may provide for sheltering in place.

As used herein, a "responder" is any person, and groups of persons, that responds at any time to an incident. Non-limiting examples of responders include personnel with public service and governmental organizations such as those with a fire department, police department, emergency medical services, search-and-rescue, Coast Guard, National Guard, power companies, water companies, and any other persons or entities that respond to an incident.

As used herein, "coupling" refers to establishment of a communications link between two or more devices. A coupling may utilize any known and/or later arising communications and/or networking technologies, standards, protocols or otherwise. Non-limiting examples of such technologies include packet switch and circuit switched communications technologies including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, BLUETOOTH™, Near Field Communications (NFC), ZIGBEE, and others.

As used herein, "real-time" generally relates to periods that arises within a given window about an incident. Real-time may include a period that occurs prior to an incident being initiated, while an incident is on-going, and post-termination of an incident.

As used herein, an incident is considered to be initiated when a "first alert condition," (as also used herein, an "alert") is determined to presently exist or likely to exist within a given time period. For at least one implementation, the given time period may be within a few second or minutes of a current time. For another implementation, a given time period may be within an hour, multiple hours, or even days (as may occur in the case of a potential hurricane) of a current time.

An alert may be determined automatically, semi-automatically, by a human action, or otherwise. For example, an alert may be detected by a building structure's fire alarm system, resulting in an alarm code being generated. Likewise, an alert may be communicated semi-automatically by an activation of an alarm panel, which may occur by a user action. Likewise, an alert may be determined by human interaction with a person calling an emergency response system and verbally communicating incident type and/or location information to operators of the emergency response system.

An incident—once initiated—may be considered to be terminated when an authorized responder designates the same as so occurring, such as by providing an "all clear message" status or the like (herein, a "clear"). Thus, an incident is typically bounded by an initiation time, as based on a first alert condition being initiated and/or detected, and a termination time, as based on an all clear message.

Data available to a given user and a responder prior to initiation of an incident may be informative to a user device associated with the given user and/or to a responder in assessing how to respond to a given incident, what egress instructions to provide, what additional information to provide to the given user and/or the responder, and the like.

As used herein, "real-time data" mayo include, for at least one implementation, data captured prior to and/or during an alert being generated for a given incident. Such real-time data is generated by a monitoring device. For example, data pertinent to a building fire may include floorplans for the building, egress locations (e.g., stairwells, external windows), fire alarms activated, sprinklers activated, and the like. Some of the real-time data may exist, temporally, such as before the alert is initiated. Likewise, some of the real-time data may expire, unless other actions are taken, prior to a clear. Accordingly, as used herein, real-time data may include data arising prior to an incident, data arising during an incident, and when available, data preserved for later use after an incident is cleared.

In accordance with at least one implementation of the present disclosure, real-time data may be captured, recorded, and communicated to users and/or responders using any know or later arising technologies. Such real-time data may be processed automatically, semi-automatically and/or manually into real-time information. As used herein, "real-time information" refers to information presented to a user and/or a responder during an incident. Real-time information may be derived from any available real-time data. A non-limiting example of real-time information may include an egress route that is updated as an incident (e.g., a building fire) advances within the building structure and such advancements preclude use of a given one or more egress locations.

For example, and not by limitation, real-time data may include image data that may be captured, processed or otherwise converted into image information using any currently available and/or later arising image capture, processing, and/or presentation technologies. For example, image data may be captured across any range of the electromagnetic spectrum including, but not limited to, the human visible perceptible range, the infrared range, X-Ray ranges, or otherwise. Such image data may be converted into any humanly perceptible image format and presented as image information to a user and/or a responder. Non-limiting examples of humanly perceptible image information include still, moving, time-lapse, time-warp, slow-motion, and other image and/or video (moving picture), graphic and other human visually perceptible formats.

Similarly, and for at least one implementation, real-time data may include sound data that is captured, processed and presented as humanly perceptible sound information using any currently available and/or later arising sound technologies. Sound information may be presented to a user and/or a responder as real-time information during an incident.

It is to be appreciated that other forms of real-time data and real-time information may be provided to a user and/or a responder during an incident. Non-limiting examples of such data and information include environmental data, such as tornado direction, tornado wind speed, surge height (e.g., for a hurricane), and other forms of environmental data and information. Any form of environmental data capture, communication, preservation, and presentation technologies may be utilized with one or more implementations of the present disclosure to provide real-time environmental information to a user and/or a responder regarding an incident.

For at least one implementation, real-time data and real-time information may include one or more of various delineable sub-categories of information, such as location data and location information, structural data and structural information, population data and population information, geographic data and geographic information, hazard data and hazard information, and other sub-categories of data and information. For a non-limiting example, "location data" and "location information" may include data and information identifying an incident location. For a non-limiting example, "structural data" and "structural information" may include data and information regarding the structural characteristics of a building. Such structural characteristics may include, for example, locations of walls, doors, windows, stairwells, stand-pipes, sensor locations, or the like. The structural data may be obtained from blueprints or other data source and converted into structural information presented to a user and/or a responder. As discussed below, such structural information may be provided to and used to assist a user in egressing from the building, assisting a responder with routing to a user and/or about an incident location, for example, directions to an interior office located on a floor of a multi-story building in which one more users may be sheltering in place, trapped by a fire, or otherwise.

For at least one implementation, real-time data and real-time information may include "population data" and "population information." Such population data may include, for example, an identification of a name, physical characteristics, number of persons and other data relating to one or more persons that may typically be present and/or are detected as being present at or about an incident location. Such persons may include users of a user device configured for use with an implementation of the present disclosure and others. Such population data may also include any information about whether such one or more persons are present, missing, absent, and/or likely to still be present at an incident location. Non-limiting examples of such population information may include height, weight, age, image, language preferences, disability concerns, medical condition(s), or other information about a person. For at least one implementation, population information may be presented to a user and/or a responder to a given incident. Such population information may include elements of relevant population data. For example, a responder (such as a fire department person) conducting a search may be presented population information regarding users and/or persons at or within a given area of the building, or otherwise. Population information may be further filtered by users, and/or persons, who have safely evacuated the building.

For at least one implementation, real-time data and real-time information may include "geographic data" and "geographic information." Geographic data may include data that arises in addition to a given location's geographic coordinates (as measured in terms of position, altitude, elevation, attitude, or otherwise). A non-limiting example of geographic data includes data indicative of whether or when a given forest area previously burned (for example, for use in directing a user a safe egress route away from a forest fire incident), the efficacy of prior response techniques, and the like. Such geographic data may be provided to a user and/or a responder as geographic information that aids the user in egressing from the incident and the responder in responding to the incident.

For at least one implementation, real-time data and real-time information may include "hazard data" and "hazard information." Hazard data may include, for example and not by way of limitation, any data indicative of any known, detectable, or otherwise arising hazards at an incident location. Non-limiting examples of hazards include furniture locations, presence of accelerants (oxygen, paint, chemicals, or the like), and other hazards. The presence, characteristics and/or location of such hazards may be used in providing egress directions to a given user, where such directions avoids hazards, when possible. Likewise, hazard data may be presented to a responder as hazard information that the responder may utilize in determining a route to a given user, while the responder is responding to a given incident. For at least one implementation, hazard information and/or other information may be presented visibly to a given user and/or to a responder by use of color codes or the like that indicate a relevance, safety concern, or other consideration the user and/or responder may be aware of in egressing the building and/or responding to an incident.

With the advent of interconnected devices, such as IoT devices and other peripheral devices (hereafter individually and collectively, an "IoT device"), global positioning system (GPS), Wi-Fi mesh systems, and other technologies, it is to be appreciated that an insignificant amount of real-time data is presently available and may grow. Such data and relevant information generated therefrom may be provided to a user and/or a responder by an implementation of the present disclosure.

"Substantially simultaneous(ly)" means without incurring a greater than expected and humanly perceptible delay between a first event or condition, such as a presentation of content obtained from one or more first data packets, and a presentation of a second content obtained from one or more second data packets. Substantial simultaneity may vary in a range of quickest to slowest expected delay to longer delay. It is to be appreciated that the subject and acceptable threshold of "substantial simultaneity" is also distance, data processing, and data communication capabilities dependent. For example, content provided in data packets over gigabit Ethernet capable local area network (LAN) connections may have a shorter acceptable delay period than content presented over a 3G network, where data communications are knowingly slower and thus a given (longer) delay period may satisfy a subject substantially simultaneous threshold.

"Data" (which is also referred to herein as a "computer data" and "data packet(s)") refers to any representation of facts, information or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

A "computer engine" (or "engine") refers to a combination of a "processor" (as described below) and "computer instruction(s)" (as defined below). A computer engine executes computer instructions to perform one or more logical operations (herein, a "logic") which facilitate various actual (non-logical) and tangible features and function provided by a system, a device, and/or combinations thereof.

"Cloud" refers to cloud computing, cloud storage, cloud communications, and/or other technology resources which a given user does not actively manage or provide. A usage of a Cloud resource may be private, public, hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided using a processor, one more software components may be used and a given module may be include a processor configured to execute computer instructions. A person having ordinary skill in the art (a "PHOSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an a given basis, or otherwise. Any known or later arising technologies may be used to provide a given module and the features and functions supported therein.

Herein for purposes of description consistency and ease of reference and not by limitation, the following number convention is used: "FFF(n-m)", where "FFF" indicates a type of item by a number (e.g., 102 indicating a node), "n" represents a floor of a building (e.g., 102(1) indicating a node 102 on the first floor (1) of a building), and "m" indicates a series number (e.g., 102(1-2) indicating a second node on the first floor of the building).

As shown in FIGS. 1A-1D and in accordance with at least one implementation of the present disclosure, a building 100 may include one or more floors 101. Structures 106 may exist on a given floor 101 of the building 100. Non-limiting examples of structures 106 include offices, restrooms and the like. Obstacles 107 may also exist on a given floor 101 of a building 100. Non-limiting examples of obstacles 107 include cubicles, printer stands, trash bins, and the like. As used herein, an "obstacle" 107 is an object located on a floor 101 of a building 100 around which a given user 115 would not commonly traverse but could traverse over or move out of a path of an egress route under emergency conditions.

The building 100 includes a mesh network which provide wired and wireless connectivity between two or more electronic devices therein. In a mesh network, electronic devices may be a node 102 that may be connected directly, dynamically, and non-hierarchically facilitate communications by and between other devices.

As shown in FIG. 1A and for at least one implementation, at least three mesh nodes 102 are included in the building 100. For example, the building 100 may include a first floor 101(1) on which a first mesh node 102(1-1) and a second mesh node 102(1-2) are located, a second floor 101(2), and a third floor 101(3) on which a third mesh node 102(3-3) and a fourth mesh node 102(3-4) are located. For a given implementation, any number and locations of mesh nodes 102 may be used and located at any locations.

The building 100 also includes a hub 122 which facilitates "monitoring services" (as further described below) which include services that facilitate user location determination, the providing of egress instructions to a given user, and otherwise. The hub 122 may also provide other services, such as controlling and configuring mesh nodes 102, local devices 108, user devices 116, and otherwise. For purposes of illustration, the hub 122 is depicted as residing on the first floor 101(1). It is to be appreciated that the hub 122 may be physically located at any location within or external to the building 100 and coupled to other system elements, such as mesh nodes 102, local devices 108, and user devices 116, by one or more wired and/or wireless communications links.

For at least one implementation, a "monitor" 122 is a computing device, such as a server, which facilitates monitoring services. Non-limiting examples of a hub 122 includes those provided by CONTROL4™, Apple HomeKit™, Google NEST™, Philips HUE™ CRESTRON™, LOREX™ ADT™, and others. A hub 122 may be located within one or more actual and/or virtualized processors provided within a given building 100 and/or external to a given building 100, such as a web server, a Cellular server, or otherwise. Mesh nodes 102, local devices 108 and user device 116 may be coupled to the hub 122 using any known or later arising wired and/or wireless communications technologies. For at least one implementation, the hub 122 facilitates communications, using an external network 124 such as the Cloud, with a responder device 126.

Individually and collectively, the system of mesh nodes 102, local devices 108, user devices 116, hub 122 and responder device 126 facilitate the exchange of real-time data and real-time information therebetween both within the building 100 and/or with users, responders and/or others external to the building 100. Such real-time information may include egress instructions for one or more users 115, incident information, and other data.

Herein, a "node" 102 is an electronic device, configured for use in a mesh network, which performs one or more "networked functions." Non-limiting examples of mesh nodes 102 include Wi-Fi routers, Wi-Fi bridges, network extenders, and the like. A node 102 facilitates wireless communication between one or more of another node 102, a local device 108, and/or a user device 116 with a hub 122. For at least one implementation, a node 102 operates using Wi-Fi communications technologies and protocols. Other communications technologies and protocols may be used for another implementation.

Herein, a "local device" 108 may include any wireless communications capable device that is coupled to the hub 122, via the mesh network, at a given time. Non-limiting examples of local devices 108 include "computing devices," such as laptop computers, personal computers, tablet computing devices, desktop computers, smartphones, smartwatches, and the like; "smart devices," such as smart thermostats, smart light bulbs, smart alarm systems, smart doorbells, smart locks, smart appliances, such as refrigerators, ovens, coffee makers; and any other device capable of wirelessly communicating directly or indirectly with another local device 108, with a given user device 116, and/or with a node 102 and within a given building 100. A local device 108 may be configured to perform one or more "networked functions" which includes any function that a computing device, a smart device, or another networked device can perform separately and/or in conjunction with use of a given mesh network. For a non-limiting example, a networked function of a smart device may include turning on or off of one or more lamps, raising/lowering blinds, changing temperature settings of a thermostat, or the like. A local device 108 may be configured to operate independently (e.g., raise blinds when daylight is detected) and/or based upon instructions and data received from a hub 122 connected thereto. A local device 108 may be connected to a hub 122 by a wired or wireless coupling directly, or indirectly.

Herein, a "user device" 116 is a portable wireless communications capable device that is coupled to the hub 122, via the mesh network, at a given time, where the device is associated with a user 115 and commonly located with the user 115. Non-limiting examples of local devices 108 include smartphones, smartwatches, and the like. While a user device 116 may include one or more forms of local devices 108, herein a distinction between a user device 116 and a local device 108 is that a direct, logical association is commonly recognized to exist between a given user device 116 and a given user 115. A local device 108 may be used by two or more users or persons, may be fixed or commonly provided at a fixed building location, and otherwise not commonly directly associated with a given user 115.

Herein, a "monitoring service" is any currently available and/or future arising service which facilitates access, control, detection, monitoring, use, configuration or otherwise of a building 100 and/or devices, including mesh nodes 102, local devices 108 and user devices 116, within a given building.

A "responder device" 126 is a mobile device associated with a responder 128 or a team of responders and provided with relevant data and generates relevant information for a given responder 128 based upon the responder's actual location relative to an incident location. Non-limiting examples of a responder devices 126 include smartphones, smartwatches, smart glasses, and the like. Such relevant information may be communicated to the responder 128, by the responder device 126, using any human presentation technologies including, but not limited to, audible, visual, tactile, vibrational, or otherwise. For at least one implementation, at least some of the relevant information is presented to the responder 128 using augmented reality technologies. Using augmented reality technologies, a responder 128 may be presented with one or more visible and/or audible indicators providing relevant information about the incident. For example, a pathway to the incident location may be presented visibly. Audible instructions may be presented which assist the responder in navigating to the incident location and rendering assistance, determined real time, instructed by commanders, or otherwise.

The building 100 may include one or more egress locations 104. For a non-limiting example, a stairwell may provide a first egress location on the respective floor. Similarly, windows may provide one or more second egress locations, such as windows 104(1-2), 104(2-2) and 104(2-3). As further shown in FIG. 1A, a user 115 may be positioned, at given time, at a given location within the building 100. The user 115 may be associated with and logically represented by a user device 116 (as further described below).

Figure 1B:
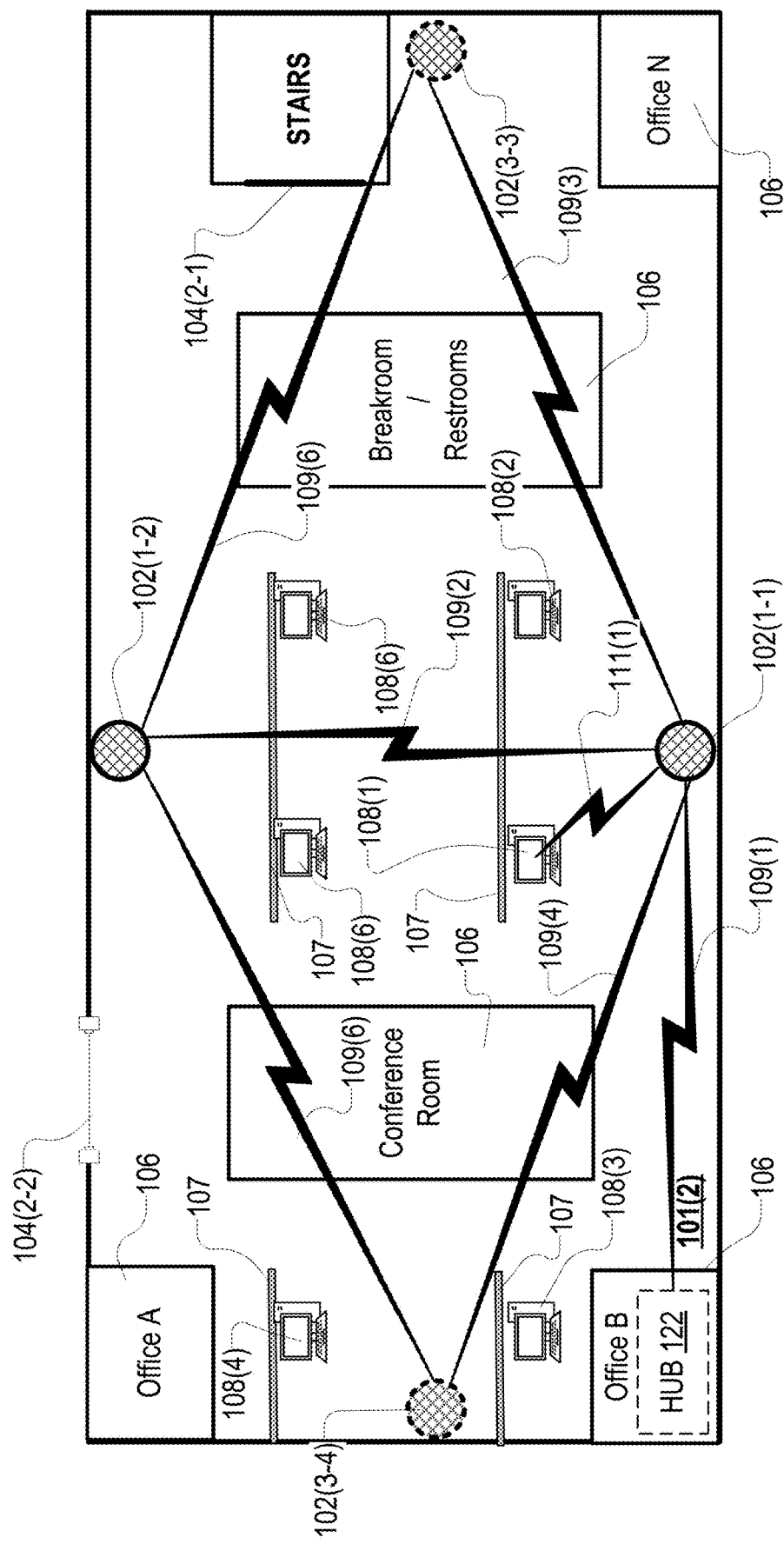
FIG. 1B is a floorplan representation of a floor of the building of FIG. 1A which further shows node connections between an electronic device and multiple nodes and in accordance with at least one implementation of the present disclosure.

As further shown in FIG. 1B, a node 102 may be wirelessly coupled to the hub 122 and/or one or more additional mesh nodes 102. For at least one implementation, such wireless communication links are referred to as a "node to node connection" (MNNC) 109. A given node 102 may be coupled directly or indirectly to the hub 122. For a non-limiting example, the fourth mesh node 102(3-4) may be coupled by a fourth MNNC 109(4) to the first mesh node 102(1-1) which is coupled by a first MNNC 109(1) to the hub 122.

As further shown in FIG. 1B, one or more local devices 108 may also be coupled to the hub 122 by a local to mesh node connection (LMNC) 111 with a node 102, which is coupled to the hub 122 by one or more MNNCs 109. For a non-limiting example, a first local device 108(1) may be coupled by a first LMNC 111(1) to the first mesh node 102(1-1), which is coupled by the first MMNC 109(1) to the hub 122.

Figure 1C:
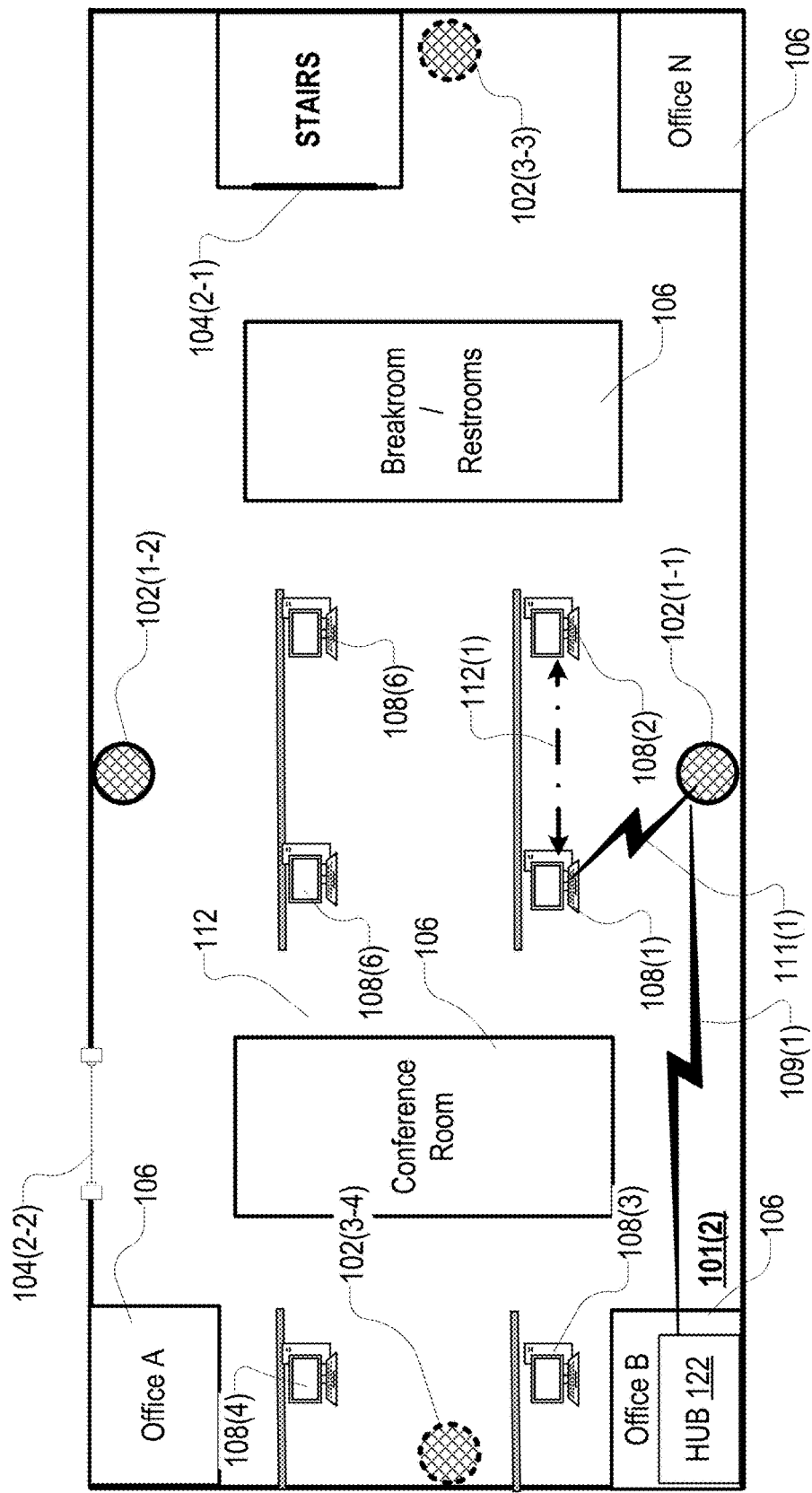
FIG. 1C is a floorplan representation of a floor of the building of FIG. 1A which further shows local connections between an electronic device and other electronic devices and in accordance with at least one implementation of the present disclosure.

As shown in FIG. 1C, a local device 108 may operate as an intermediary node between one or more other local devices 108 to facilitate coupling of a given local device 108 with a hub 122 by use of one or more local connections (LC) 112, a LMNC 111, and a MNNC 109. For a non-limiting example, a second local device 108(2) may be coupled by a first LC 112(1) to the first local device 108(1), which may be coupled by the first LMNC 111(1) to the first mesh node 102(1-1), which may be coupled by the first MNNC 109(1) to the hub 122.

Figure 1D:
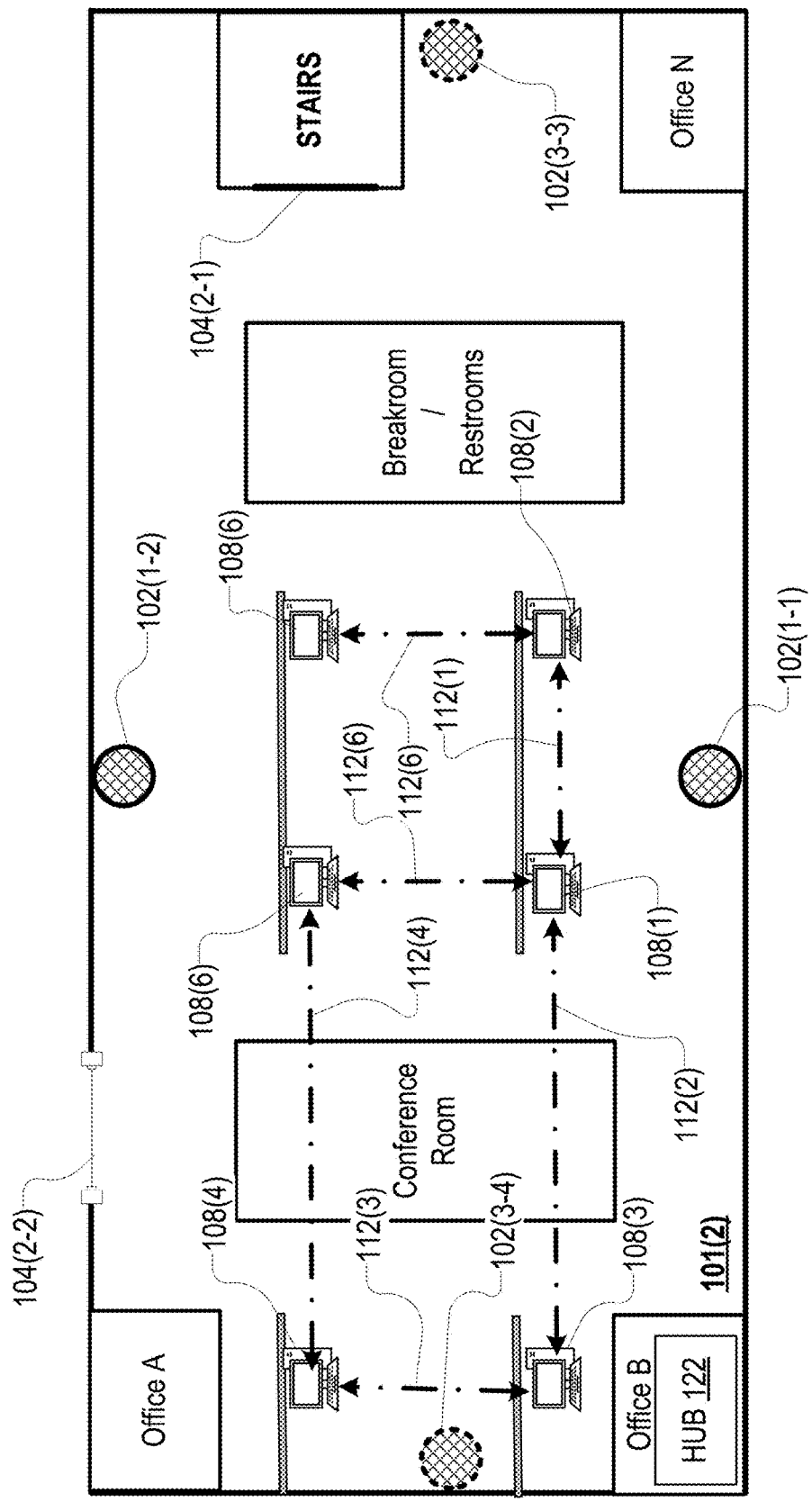
FIG. 1D is a floorplan representation of a floor of the building of FIG. 1A which further shows node connections between an electronic device and multiple nodes and local connections between the electronic device and other electronic devices and in accordance with at least one implementation of the present disclosure.

As shown in FIG. 1D, a mesh network may include multiple LCs 112, such as the second LC 112(2) coupling the first local device 108(1) with the third local device 108(3), the third LC 112(3) coupling the third local device 108(3) with the fourth local device 108(4), the fourth LC 112(4) coupling the fourth local device 108(4) with a fifth local device 108(5), a fifth LC 112(5) coupling the first local device 108(1) with the fifth local device 108(5), a sixth LC 116(6) coupling the second local device 108(2) with a sixth local device 108(6), and the like.

One or more of the mesh nodes 102, local devices 108, and user devices 116 may be coupled to a responder device 126 by a responder connection 127 (RC). An RC may be direct between two or more devices or indirect via one or more intermediary devices, such as via the hub 122 and an external network 124, to the first mesh node 102(1-1), or otherwise.

A mesh network may include any combination and permutation of MNNCs, LCs, UDMNC, LMNC, LC, UDLCs, and RCs. One or more of such connections may be transient (e.g., a local connection existing when a respective device is powered on), substantially permanent, provided on an as needed basis, or otherwise.

Figure 2A:
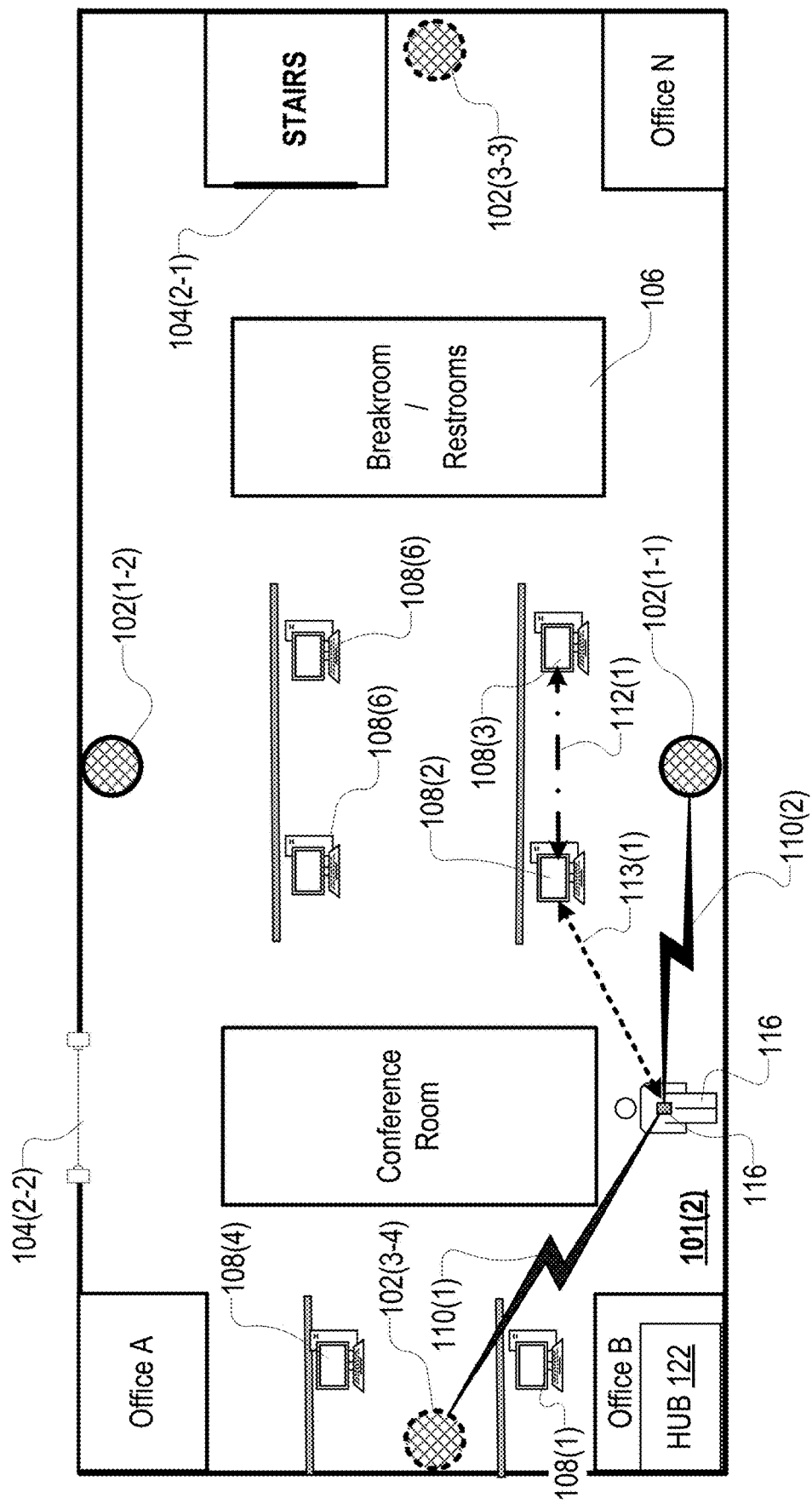
FIG. 2A is a floorplan representation of the floor of the building of FIGS. 1A and 1B which further depicts a user device, associated with a user, at a first location, coupled to one or more nodes of the mesh system and in accordance with at least one implementation of the present disclosure.

As shown in FIG. 2A, a user 115, as virtually represented by a user device 116 possessed by and associated with a given user, may be present in the building 100. As shown, the user 115 is illustrated as being present on the second floor 101(2) of the building 100. The user device 116 may establish one or more UDMNCs 110, such as a first UDMNC 110(1) and the second UDMNC 110(2). For an implementation, the user device 116 may also establish one or more UDLCs 113, such as a first UDLC 113(1). The UDLC 113 may be established using Wi-Fi signals, or other wireless communications technologies.

For at least one implementation, a precise location of the user device 116 (and thereby the user 115) may be determined by one or more of the hub 122 and/or the user device 116 based on one or more wireless signal properties associated with the one or more UDMNCs 110 and/or UDLCs 113 coupling the user device 116 with a node 102 or a local device 108. For at least one implementation, a precise user device location determinations may utilize known principles of wireless signal delays, received power levels (with it being known that received wireless signal strengths commonly decrease with distance of a receiving device from a transmitting device), or otherwise. For an implementation, precise user device location may utilize known principles of multiple signal triangulation to generate multiple location areas in which the user device 116 is then determined to be located in an overlapping sub-area of the multiple location areas. As is well known, as the number of wireless couplings increases and signal properties of such couplings are determined the location areas used may increase such that the overlapping area decrease in geographic size until a given location area is defined within a given error range, such as within less than fifty centimeters (50 cm). Other known and/or later arising multiple signal based device location techniques may be used for an implementation of the present disclosure.

Figure 2B:
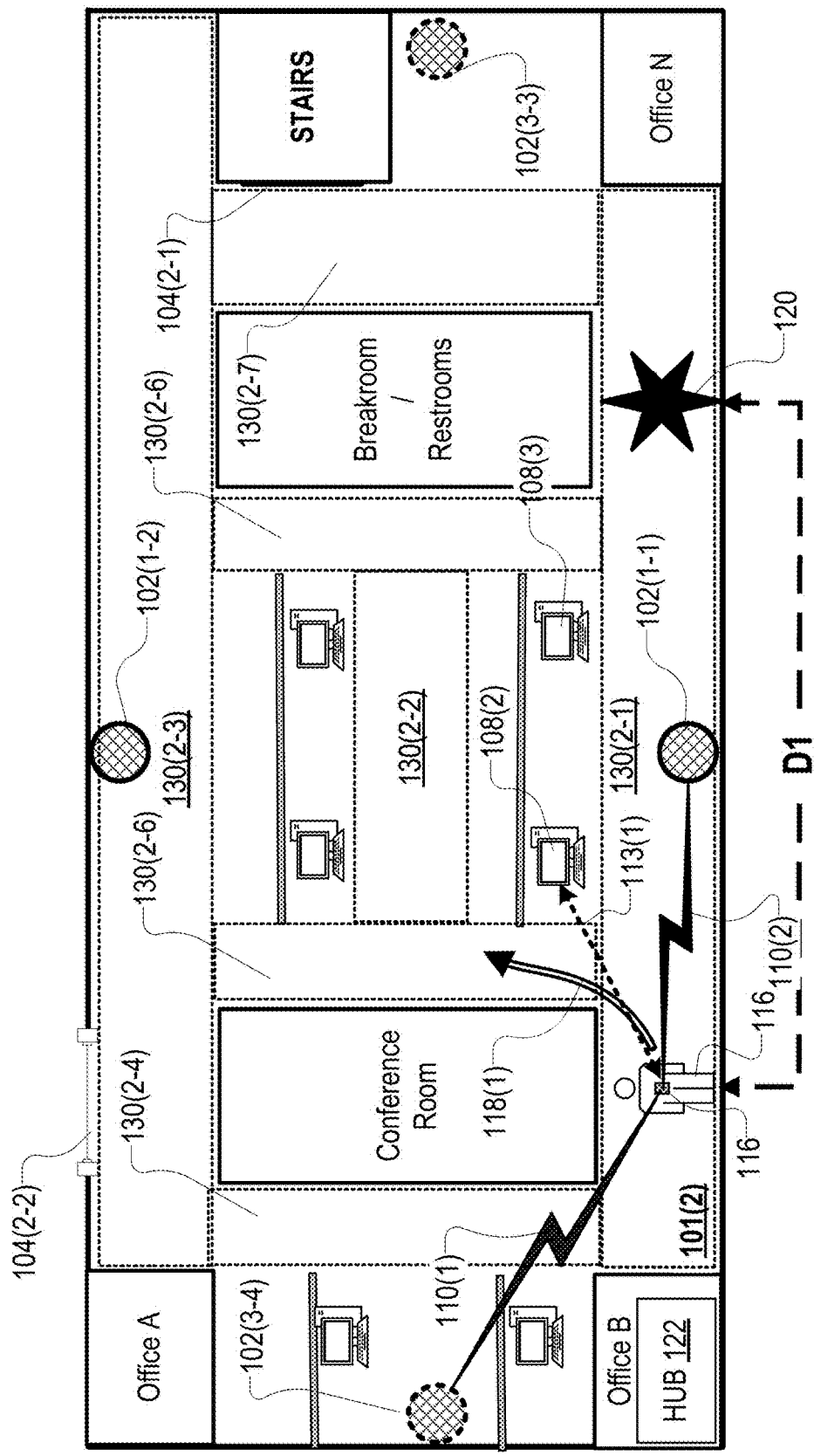
FIG. 2B is a floorplan representation of the floor of the building environment of FIGS. 1A, 1B and 2A which further depicts the user device, at the first location, coupled to nodes of the mesh system, an incident location, and a first egress route portion that has been communicated to the user device in accordance with at least one implementation of the present disclosure.

As shown in FIG. 2B, a floor 101, such as the second floor 101(2) may be physically defined in terms of one or more hallways 130, such as first hallway 130(2-1) through a seventh hallway 130(2-7) (the hallways being represented by dashed outlines in FIG. 2B).

An incident may occur at an incident location 120. The incident may be of any type and may occur at any location within or external to the building. For this non-limiting illustrative example, the incident 120 is a structure fire on the first floor 101(1) of the building 100 that involves at least a portion of the second floor, first hallway 130(2-1). As shown, a user 115 may be located at a distance D1 from the incident 120. The incident 120 is at such a location that safe egress by the user 115 in a horizontal direction along a first hallway 130(2-1) to the second hallway 130(2-2), the second hallway being connected to the first egress location 104(2-1) (in this example, the stairs), is not advised.

In accordance with at least one implementation, an alert may be provided to the user device 116. The alert may be tailored for the specific user device 116 or more generally provided to multiple user devices. The alert may initiate a location engine 403(A) (as described below) which facilitates identification of a current location of the user device 116 (if not previously known by the hub 122) and an egress engine 403(B) (as further described below) which facilitates identification of at least a first egress route portion 118(1) to the user 115 (via a suitable user interface provided on or with the user device 116). As shown in FIG. 2B for this illustrative example scenario, the first egress route portion 118(1) instructs the user 115 to proceed via the second floor, fifth hallway 130(2-5). The egress engine 403(B) in the user device 116 may be configured to provide the egress route as a floorplan layout, as step-by-step/turn-by-turn directions, or otherwise. The one or more egress route portions 118 may be presented in any humanly perceptible format such as audibly, visually, tactilely, in an augmented reality format, combinations of the foregoing, or otherwise.

Figure 2C:
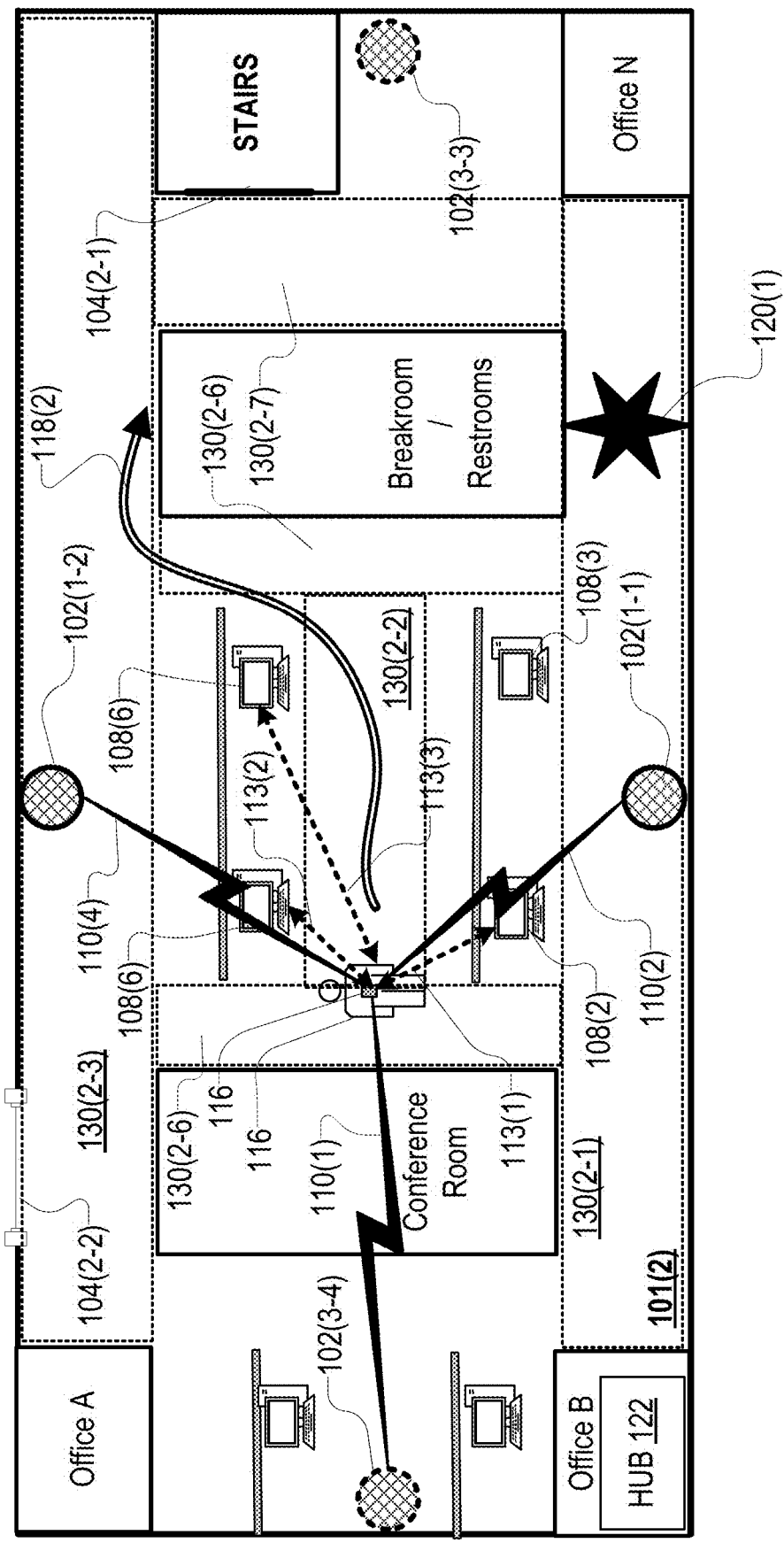
FIG. 2C is a floorplan representation of the floor of the building environment of FIGS. 1A, 1B, 2A and 2B, which further depicts the user device, at a second location, coupled to nodes of the mesh system, the incident location, and a second egress route portion that has been communicated to the user device in accordance with at least one implementation of the present disclosure.

As shown in FIG. 2C, the mesh system may be further configured to activate and deactivate communications links between the user device 116 mesh nodes 102 and/or local devices 108. Such activations/deactivations may occur upon instruction from the hub 122, upon instruction from the user device 116, as provided for example by the location engine 403(A) executing on the user device 116, or otherwise.

For at least one implementation, multiple additional connections may be activated such that system redundancies may be provided for both identifying a current location of the user device 116 (and presumably the user 115 associated therewith), providing further real-time information on the incident, and providing updated routing instructions for a second egress route portion 118(2) on an as needed and/or real-time basis.

For example, and with respect to the user device 116, a second UDLC 113(2) may be established with a fifth local device 108(5), a third UDLC 113(3) may be established with a sixth local device 108(6), and a fourth UDMNC 110(4) may be established with second mesh node 102(1-2). As illustrated for this non-limiting examples, the first mesh node 102(1-1) and second mesh node 102(1-2), and the fourth mesh node 102(3-4) may be located on the first floor 101(1) and second floor 101(2) of the building 100 and thus not directly impacted by the incident 120 located on the second floor 101(2). The local devices 108(2), 108(3), etc. may be located on the incident floor, here the second floor 101(2), and thus may be directly impacted by the incident 120. As shown, a UDLC 113 is not established with the third local device 108(3).

Figure 2D:
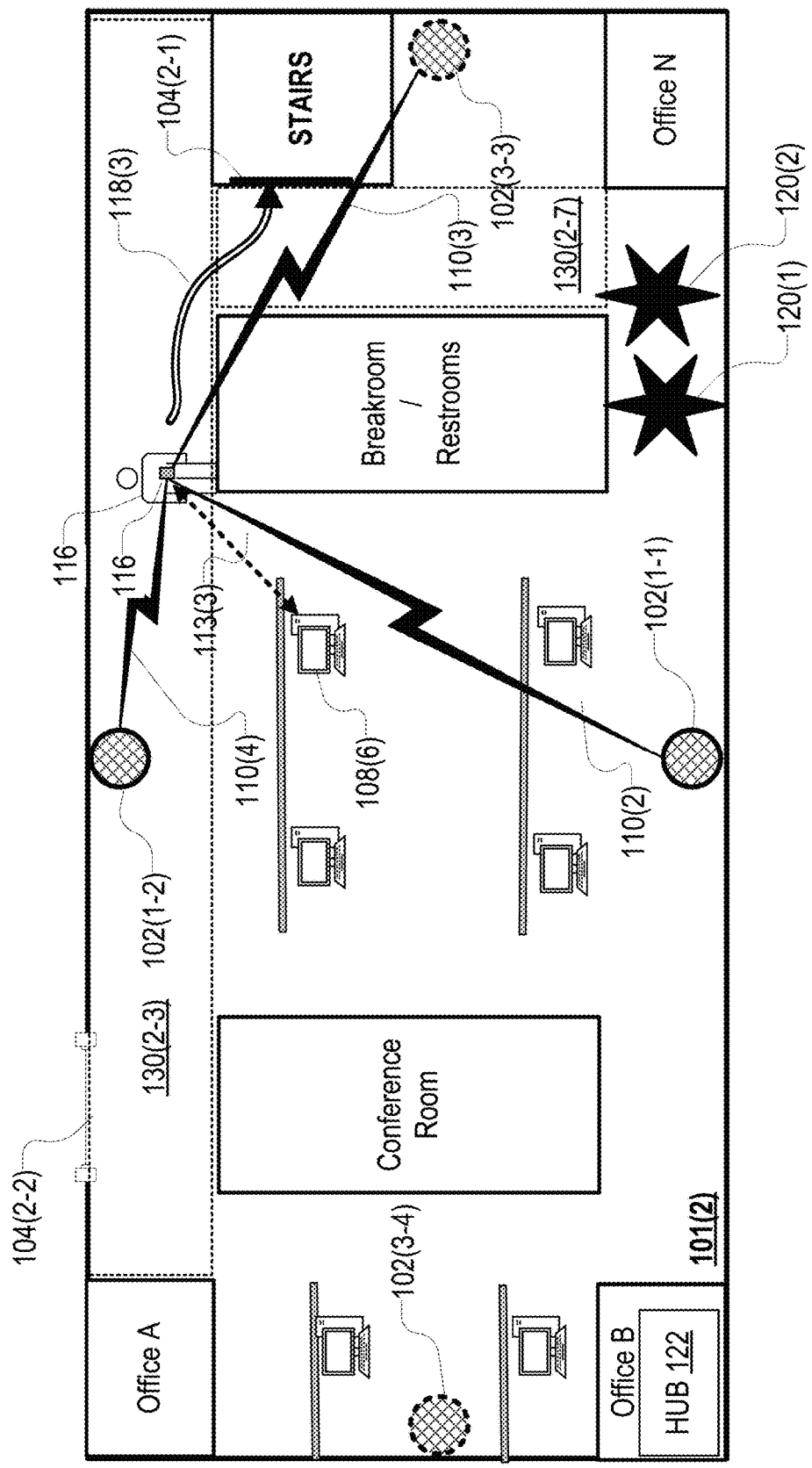
FIG. 2D is a floorplan representation of the floor of the building environment of FIGS. 1A, 1B, and 2A-2C, which further depicts the user device, at a third location, coupled to nodes of the mesh system, the incident location, and a third egress route portion that has been communicated to the user device in accordance with at least one implementation of the present disclosure.

As shown in FIG. 2D, the user 115 has progressed along the second egress route portion 118(2) to a location in the second floor, third hallway 130(2-3). At this time, the incident 120, while having expanded from the first incident location 120(1) to a second incident location 120(2), the incident does not impact egress via the second floor, first egress location 104(2-1), accordingly, instructions for a third egress route portion 118(3) may be provided to the user 115, via the user device 116. As shown, as the user 115 progresses along the provided egress route portions 118, UDMNCs and UDLCs with the user device 116 may be maintained, activated, and/or deactivated. For example, a third UDMNC 110(3) may be activated, while the first UDMNC 110(1) (as shown in FIGS. 2B and 2C) is deactivated.

Figure 2E:
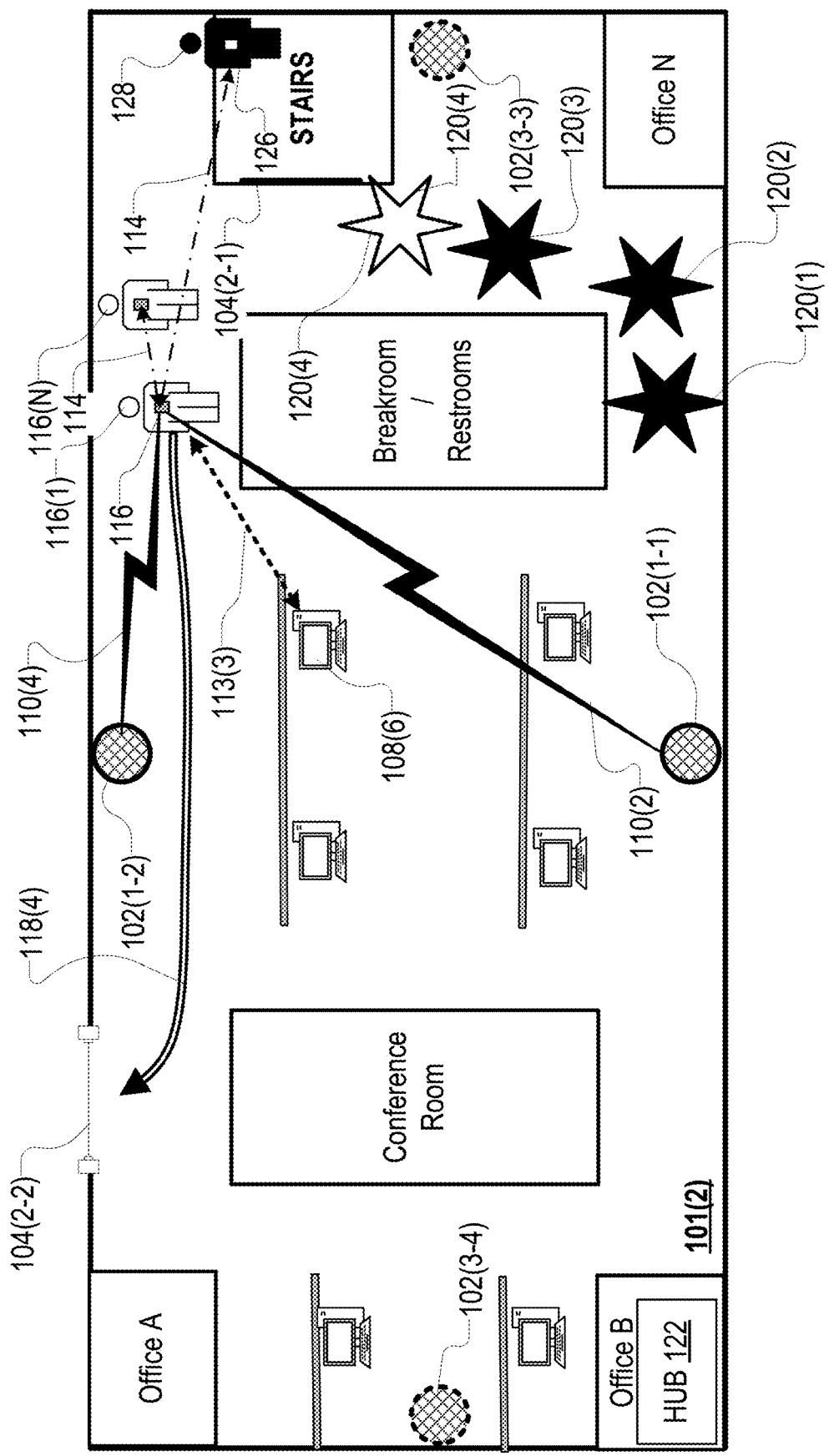
FIG. 2E is a floorplan representation of the floor of the building environment of FIGS. 1A, 1B, and 2A-2D, which further depicts the user device, at the third location, coupled to nodes of the mesh system, where an expansion of the incident location has occurred, and a fourth, alternative egress route portion has been communicated to the user device in accordance with at least one implementation of the present disclosure.

As shown in FIG. 2E, the incident has progressed from the second incident location 120(2) to a third incident location 120(3) and is threatening a fourth incident location 120(4). Given these developments, the mesh system may be configured to real-time generate a fourth egress route portion 118(4) and instruct the user 115, via the user device 116, to proceed to the second floor, second egress location 104(2-2). As further shown in FIG. 2E, a first user device 115(1) may be coupled to another user device 115(N) by a user to user/responder connection (UURC) 114. The UURC 114 may utilize any form of communications links including cellular, BLUETOOTH, NFC, or otherwise.

Figure 3:
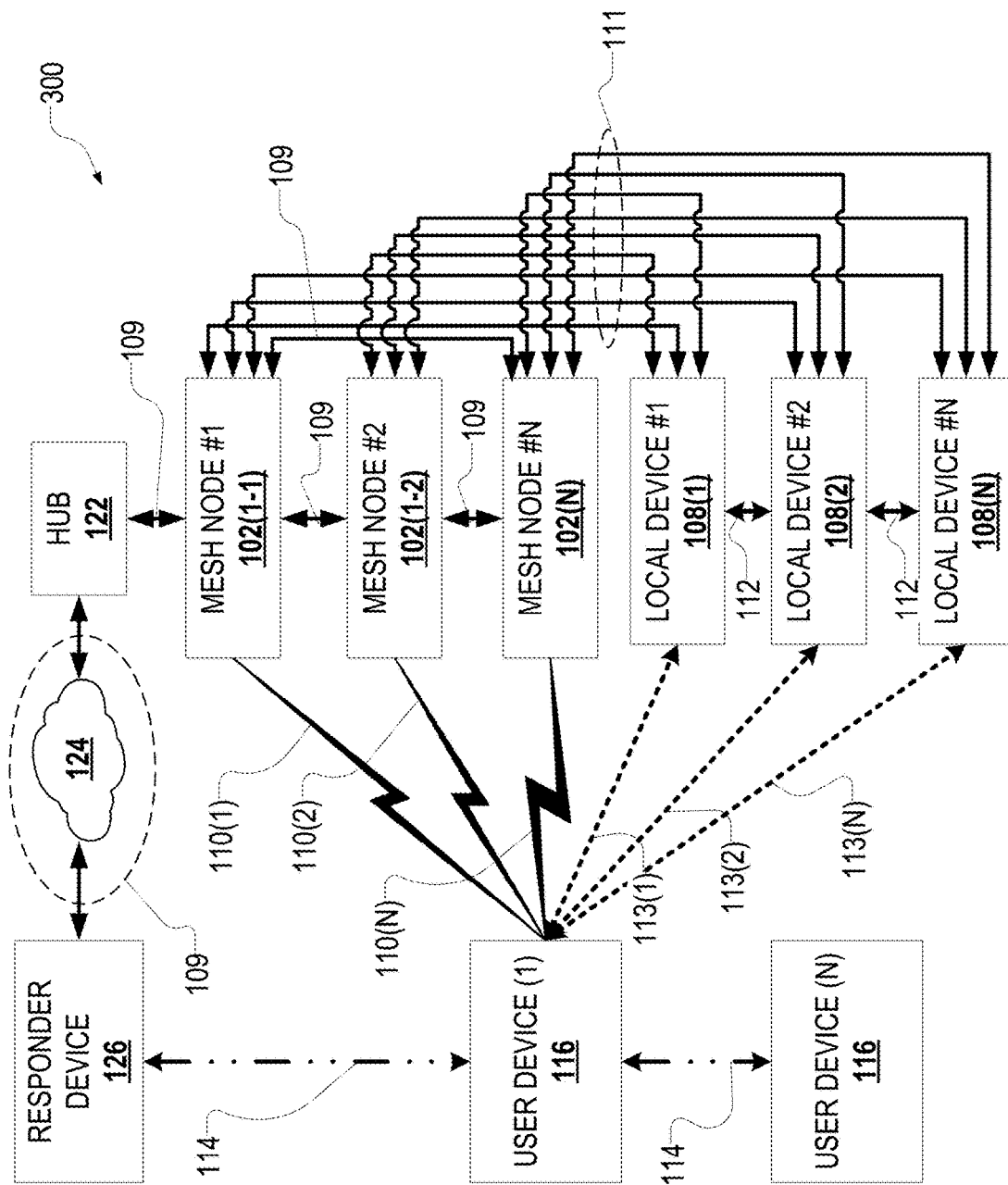
FIG. 3 is a system schematic representation of devices and communications links established between therebetween which form one or more nodes of a mesh system and in accordance with at least one implementation of the present disclosure.

As shown in FIG. 3, a mesh system 300 includes one or more mesh nodes 102, local devices 108, user devices 116, a responder devices 126 with various connections established therebetween. The mesh system 300 facilitates precision location determination of a user device 116 within a building 100.

Figure 4:
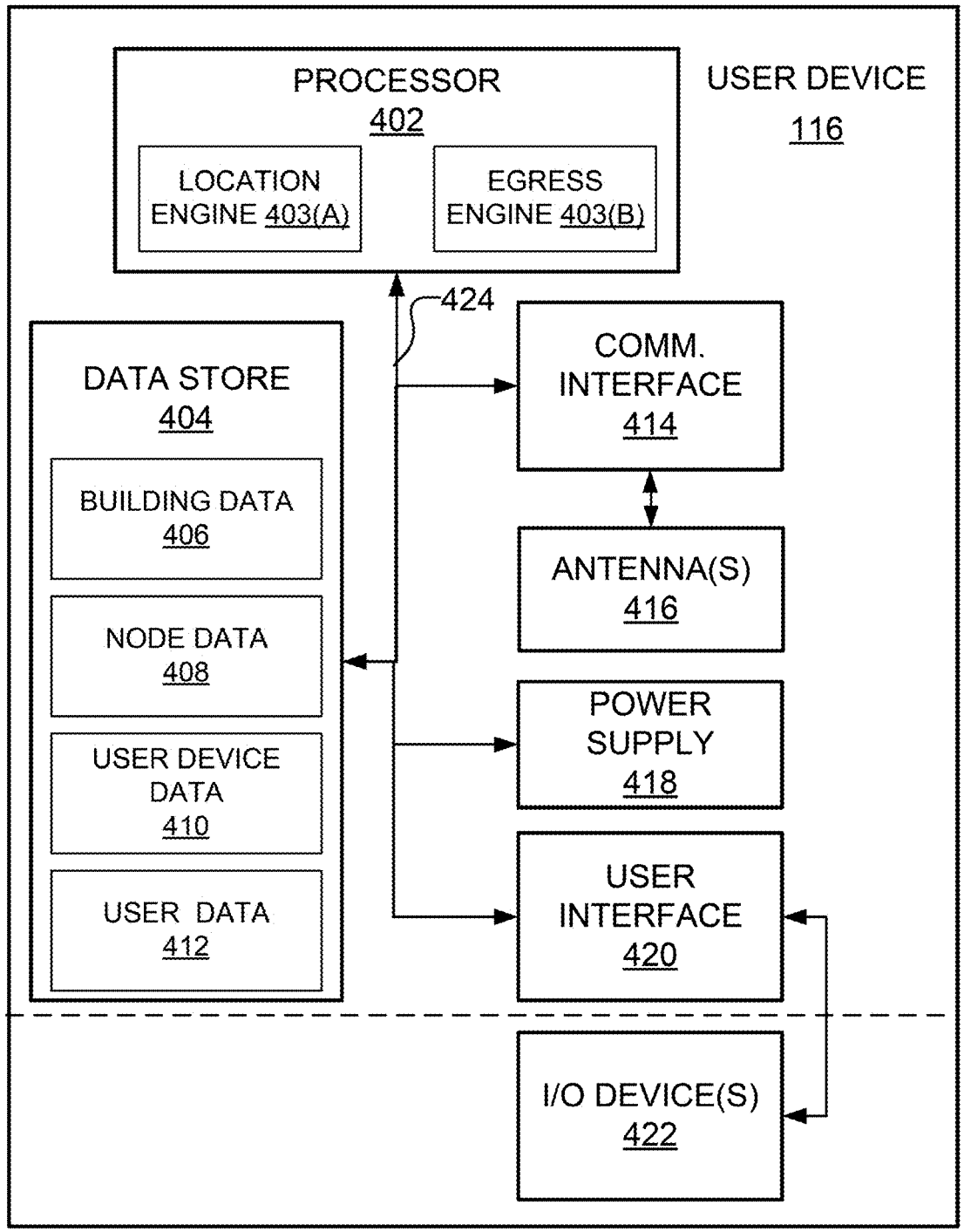
FIG. 4 is a schematic representation of a user device and in accordance with at least one implementation of the present disclosure.

As shown in FIG. 4, a user device 116 may include a processor 402, a data store 404, a communications interface 414 coupled to one or more antennas 416, a power supply 418, and a user interface 420 that is coupled to an input/output (I/O) device 422. The processor 402 may be configured to execute various computer instructions with respect to various computer data, which may include real-time data. The real-time data may be received by the given user device 116, directly or indirectly, from one or more components of the mesh system 300 including, but not limited to, the data store 404, the hub 122, mesh nodes 102, local devices 108, other user devices 116, responder devices 126, or otherwise. The processor 402 may perform computer instructions on the data to generate real-time information that is presented, in a humanly perceptible format, by use of the user interface 420 and one or more I/O devices.

Processor 402

The processor 402 may instantiate various computer engines including a location engine 403(A) and an egress engine 403(B).

For at least one implementation, the processor 402 may include computer hardware configured to execute non-transient computer instructions and perform computer operations on both transient and non-transient data. The hardware may include any general-purpose processor technology capable of supporting the features and functions described herein as well as any later arising features or functions to be supported. The processor 402 may be configured to execute computer instructions written in any programming language including, but not limited to, PERL, C, C+, C++, or otherwise. Such computer instructions may be assembled, compiled, interpreted, or otherwise processed into one or more machine code instructions available for execution by the hardware provided by the processor 402 or other elements of a user device 116.

Location Engine 403(A)

Figure 5:
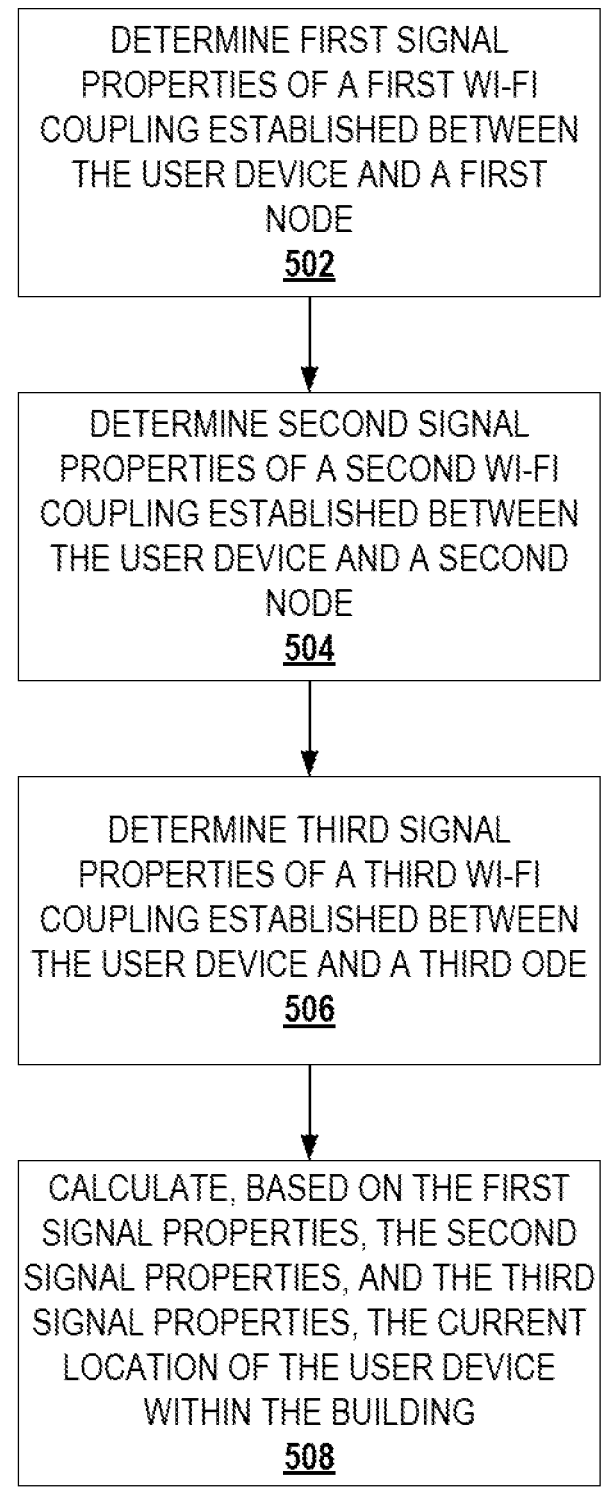
FIG. 5 is a flow chart illustrating one implementation of computer executable instructions utilized by a location engine instantiated by at least one of a user device, a hub, and a node to determine a precise location of a user device using a mesh communications system and in accordance with at least one implementation of the present disclosure.

For at least one implementation, a location engine 403(A) may be configured to execute various operations as requested by computer instructions executed by the processor 402. A non-limiting example of such operations for an implementation of the present disclosure are illustrated in FIG. 5 and are described below.

For at least one implementation, the location engine 403(A) may monitor at least one signal property of a given UDMNC 110, UDLC 113 and/or UURC 114. As used herein, a "signal property" is a determinable characteristic of a wireless coupling with non-limiting examples include received signal strength, latency, signal to noise ratio, and the like. Based upon changes of a signal property for a given coupling, a change of location of the user device 116 may be determined.

The location engine 403(A) may be configured to use wireless signal properties of multiple wireless signal connections between the user device 116 and one or more mesh nodes 102, the hub 122, local devices 108, other user devices 116, responder devices 126, or otherwise. Determinations of a current user device 116 location may be performed singularly, collectively, or otherwise by the user device 116, the hub 122, a node 102, a local device 108, another user device 116, a responder device 126, a Cloud based processor, or otherwise. For at least one implementation, the location engine 403(A) may be configured to generate current location data for the given user device 116 for communication to the hub 122, directly or indirectly to one or more responder devices 126, for presentation to a user 115 of the given user device 116 via the user interface 120 and one or more I/O devices 422, and otherwise.

During an incident, the location engine 403(A) may be further configured to report to a hub 122, changes in one or more signal properties. Such reporting may occur on one or more of: a periodic basis; when changes in the one or more signal properties are detected; when changes in a signal property are not within a given range, exceed a given threshold, or the like; when queried by the hub 122; or otherwise. Any basis for reporting may be used for an implementation of the present disclosure.

For at least one implementation, a node 102 may be configured to communicate changes in signal properties to the hub 122 where such changes are not generated based upon UDMNCs with one or more user devices 116. The node 102 may be configured to detect changes in such signal properties for the one or more UDMNCs where such changes in signal properties exceed a given threshold be used by the hub 122 and may indicate that other users 115 may be present and do not possess user devices 116 that is coupled by UDMNC and/or UDLC to the mesh system 300. The given threshold may be fixed, predetermined, variable, determined based on historical data, or otherwise.

Referring now to FIG. 5, operations performed by a user device pursuant to an implementation of a location engine 403(A) are shown.

As per Operation 502, the operations may include determining one or more first signal properties of a first Wi-Fi coupling, such as the first UDMNC 110(1) (as shown in FIG. 2A) established between the user device 116 and a first node, such as the fourth mesh node 102(3-4). It is to be appreciated that other nodes may be used to establish the first Wi-Fi coupling.

For at least one implementation, Operation 502 may further include first establishing the first Wi-Fi coupling between the user device and the first mesh node and determining a first distance between the user device 116 and the first mesh node 102(1-1) based on the one or more first signal properties of the first Wi-Fi coupling.

For at least one implementation, the first distance may be a first radius of a first ranging signal transmitted by the first node (for example and not by limitation, the fourth mesh node 102(3-4)) upon a detection of the incident by a hub 122 coupled to the mesh system 300.

As per Operation 504, the operations may include determining one or more second signal properties of a second Wi-Fi coupling, such as the second UDMNC 110(2) (as shown in FIG. 2A) established between the user device 116 and a second node, such as the first mesh node 102(1-1). It is to be appreciated that other nodes may be used to establish the second Wi-Fi coupling.

For at least one implementation, Operation 504 may further include establishing the second Wi-Fi coupling between the user device 116 and the second node and determining a second distance based on the one or more second signal properties of the second Wi-Fi coupling.

For at least one implementation, the second distance may be a second radius of a second ranging signal transmitted by the second node (for example and not by limitation, the first mesh node 102(1-1)) upon a detection of the incident by a hub 122 coupled to the mesh system 300.

As per Operation 506, the operations may include determining one or more third signal properties of a third Wi-Fi coupling, such as the first UDLC 113(1) (as shown in FIG. 2A) established between the user device 116 and a second local device 108(2). It is to be appreciated that other nodes may be used to establish the first Wi-Fi coupling.

For at least one implementation, Operation 506 may further include establishing the third Wi-Fi coupling between the user device 116 and the second local device 108(2) and determining a second distance based on one or more third signal properties of the third Wi-Fi coupling.

For at least one implementation, the first signal property may be a received signal strength, by the user device 116, of the first Wi-Fi coupling. It is to be appreciated that the first, second and third signal properties determined per Operations 502-506 may be the same signal properties, for example, a received signal strength, a time delay from the time a message is sent by a node until it is received by the user device (or vice versa), or different.

For at least one implementation, the third distance may be a third radius of a third ranging signal transmitted by the third node (for example and not by limitation, the second local device 108(2)) upon a detection of the incident by a hub 122 coupled to the mesh system 300.

Per Operation 508, the process may include calculating, based on the first signal properties, the second signal properties and the third signal properties, a current location of the user device 116 within the building 100.

For at least one implementation, Operation 508 may further include calculating, based on the first distance, the second distance, and the third distance, the current location of the user device 116 within the building 100.

For at least one implementation, where the first, second and third distances are radius, the calculating of the current location of the user device 116 within the building 100 may involve use of triangulation of the first, second and third distances.

For at least one implementation, any number of nodes and Wi-Fi couplings of the user device 116 therewith may be utilized to determine a current location of the user device 116 within or external to the building 100. As discussed above, for other implementations, the mesh system 300 may uses any given permutation of UDMNCs, UDLCs, and UURCs, and one or more signal properties of such couplings, to determine a location of a user device 116 at a given time. Wi-Fi signals may be used as well as other forms of communications signals, such as BLUETOOTH, ZIGBEE, and others.

It is to be appreciated that the operations depicted in FIG. 5 are illustrative and are not intended herein to occur, for implementations of the present disclosure, in the order shown, in serial, or otherwise. One or more operations may be performed in parallel and operations may be not performed, as provided for a given responder. For example, a responder may be recalled back to their station even while an incident is on-going for rest, recovery, availability for other incidents, or otherwise.

While the Operations of FIG. 5 are described above as being implemented by a location engine 403(A) instantiated by a processor 402 of a user device 116, it is to be appreciated that one or more of the Operations may be performed by a hub 122 or other mesh system 300 component.

Egress Engine 403(B)

Figure 6:
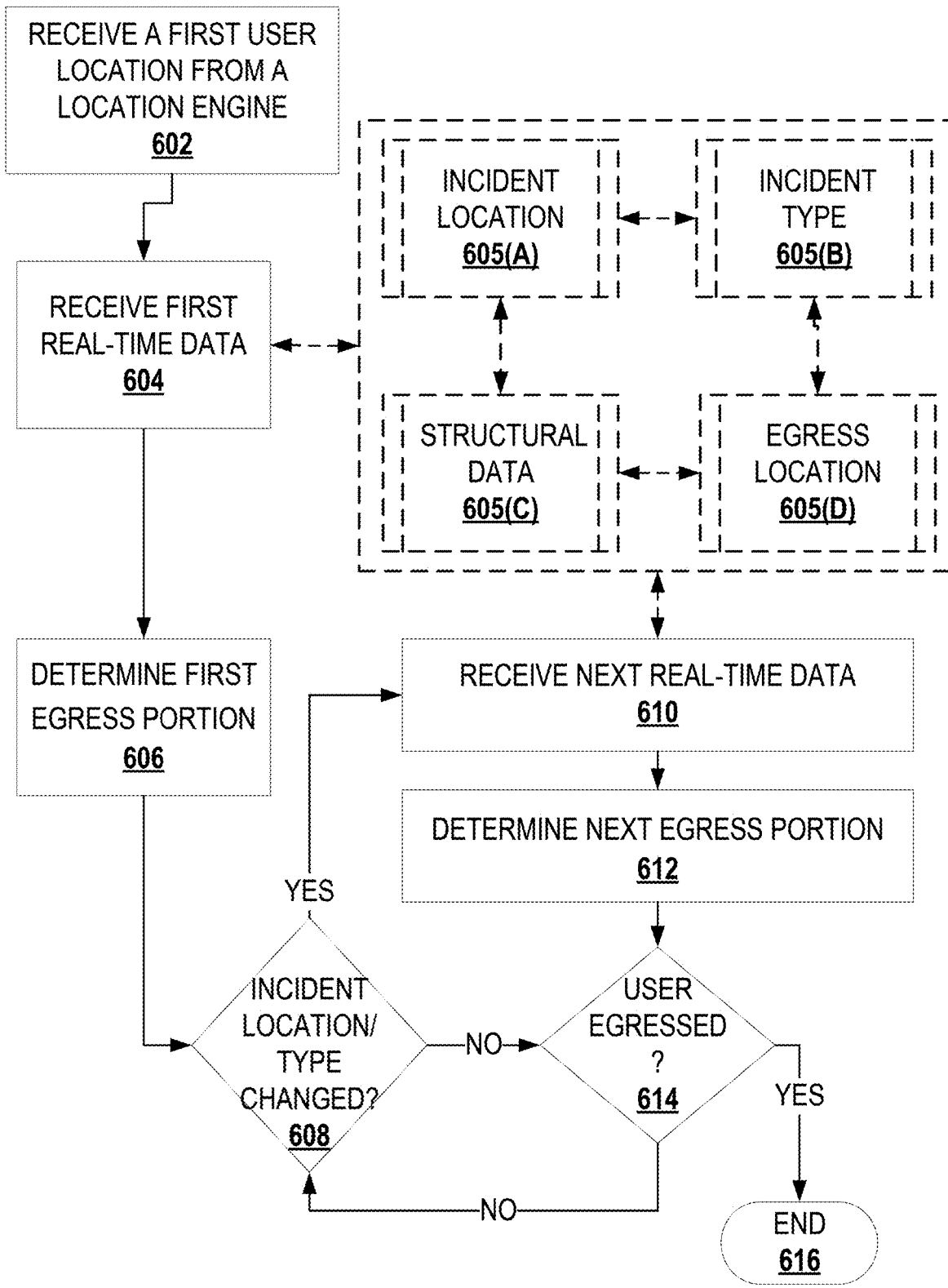
FIG. 6 is a flow charting one implementation of computer executable instructions utilized by an egress engine instantiated by at least one of a user device, a hub, and a node to provide egress instructions to a user of a user device based upon current and precise location determinations of the user device using a mesh communications system and in accordance with at least one implementation of the present disclosure.

For at least one implementation, an egress engine 403(B) may be configured to execute various operations as requested by computer instructions executed by the processor 402. A non-limiting example of such operations for an implementation of the present disclosure are illustrated in FIG. 6 and are described below.

For at least one implementation, the egress engine 403(B) may generate a real-time egress route for a user 115 of the given user device 116 in view of real-time data provided to the egress engine 403(B) by one or more mesh nodes 102, local devices 108, and/or the hub 122. The egress engine 403(B) may be configured to use data, stored in the data store 404 or otherwise provided by the hub 122, external network 124, or otherwise, in performing various computer instructions and the user device 116 in performing various operations. For at least one implementation, the egress engine Referring now to FIG. 6, operations performed by a user device pursuant to an implementation of an egress engine 403(B) are shown.

As per Operation 602, the operations may include receiving a first user location from a location engine.

As per Operation 604, the operations may include receiving a first instance of real-time data from a data source (e.g., a fire sensor, a smoke detector, or the like) and/or a data store (e.g., data store 404). Such first instance of real-time data may identify, for example, an incident location, a type of incident, information regarding the incident, whether egress from one or more portions of the building 100 is to occur, and the like. Such data and information may be utilized by the egress engine 403(B) in determining egress instructions. Such egress instructions may be individualized (e.g., by floor, user device, or the like), common (e.g., applicable to user devices on two or more floors and/or in two or more portions of the building 100), or otherwise.

As shown, the first real-time data may include one or more instances of incident location data 605(A), incident type data 605(B), structural data 605(C), egress location data 605(D) and other data (not shown).

As per Operation 606, the operations may include determining a first egress portion to communicate to a given user device 116. The first egress portion may have any length, period of applicability, or otherwise. The first egress portion may include any instructions which are intended to facilitate the safe egress, sheltering-in-place, or otherwise of a given user device within, or external to, a building in view of a given incident as represented by one or more of the real-time data available to the egress engine at a given time.

As per Operation 608, the operations may include determining whether the incident location and/or type has changed. Operation 608 may be performed on any given time interval, such as once thirty second (30 sec.), based on a trigger (e.g., a second fire sprinkler being activated within the building), a user input, inputs from a hub 122, inputs from a responder device 126, or otherwise. When the incident location and/or type has not changed, the operations may include Operation 614. When the incident location and/or type has changed, the operations may include Operation 610.

As per Operation 610, the operations may include receiving a next instance of real-time data. As per Operation 604, the next instance of real-time data may be received from any source and may include one or more of incident location data 605(A), incident type data 605(B), structural data 605(CO, egress location data 605(D), responder data (not shown), or other data.

As per Operation 612, the operations may include determining a next egress portion. The next egress portion may be unchanged from the first egress portion, may identify new routes for a given user to take, new instructions for the route (e.g., crawl when smoke is present), or the like. The operations may include Operation 614.

As per Operation 614, the operations include determining if the given user 115, as virtually represented by a given user device 116, has egressed from the building 100 or taken other directed action(s), such as reached a shelter-in-place space, or otherwise. If "yes," the operations of the egress engine 403(B) may be considered complete with respect to a given user. If "no," the operations may continue at, for example, Operation 608.

For at least one implementation, the operations performed by the egress engine 403(B) may include notifying one or more responder devices 126 of one or more of the user, user location, incident location, incident type, building structure, egress route portions provided to a given user, and the like.

It is to be appreciated that the operations depicted in FIG. 6 are illustrative and are not intended herein to occur, for one or more implementations of the present disclosure, in the order shown, in serial, or otherwise. One or more operations may be performed in parallel and operations may be not performed, as provided for a given responder. For example, a responder may be recalled back to their station even while an incident is on-going for rest, recovery, availability for other incidents, or otherwise.

While the Operations of FIG. 6 are described above as being implemented by an egress engine 403(G) instantiated by a processor 402 of a user device 116, it is to be appreciated that one or more of the Operations may be performed by a hub 122 or other mesh system 300 component.

Data Store 404

Referring again to FIG. 4, and for at least one implementation, the data store 404 may include any use and/or combination of volatile and non-volatile storage technologies presently known and/or later arising. Non-limiting examples of such storage technologies include read only memory (ROM), random access memory (RAM), cache memory, magnetic storage devices, optical storage devices, flash memory devices, and others. The data store 404 is communicatively coupled to at least the processor 402 and may be communicatively coupled to the communications interface 414 and connected for power purposes to the power supply 418.

The data store 404 may be a storage, multiple storages, or otherwise. The data store 404 may be configured to store one or more instances of building data 406, node data 408, user device data 410, user device data 410, and other data and instructions. The data store 404 may be provided locally with the user device 116 or remotely, such as by a data storage service provided on the Cloud, and/or otherwise. Storage of data may be managed by a storage controller (not shown) or similar component. It is to be appreciated such storage controller manages the storing of data and may be instantiated in one or more of the data store 404, the processor 402, on the Cloud, or otherwise. Any known or later arising storage technologies may be utilized in conjunction with an implementation of the present disclosure to facilitate the data store 404.

Any known or later arising storage technologies may be utilized for the data store 404. Non-limiting examples of devices that may be configured for use as data store 404 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the data store 404 may be partitioned or otherwise designated by the storage controller as providing for permanent storage and temporary storage. Non-transient data, computer instructions, or other the like may be suitably stored in the data store 404. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Building Data 406

For at least one implementation, building data 406 may identify a floorplan for the various floors 101 of a given building 100, location of egress locations 104 in the building 100, location of emergency supplies (such as, fire extinguishers, first aid kits, defibrillators, or the like), location of safe rooms, or other information relevant to a given incident. Building data 406 may be populated onto the user device 116 by the user device 116 actively retrieving (or "pulling") the data from the hub 122 or the hub 122 pushing the building data to the user device 116 upon the user device 116 establishing a wireless connection with a node 102 within the building 100 or upon an incident being detected and a push occurring to a user device 116 connected, at that time or at a later time while the incident is on-going, to a node 102. Building data 406 may be pushed using an emergency broadcast alert message, which may be sent over a cellular, Wi-Fi or other wireless connection, or the like.

Node Data 408

For at least one implementation, node data 408 may include data identifying locations of mesh nodes 102, local devices 108, hubs 122, and/or other user devices 116 within a building 100, the signaling characteristics of such devices, connectivity and communications protocols supported by the devices, and the like. Node data 408 may be pulled or pushed to a user device 116 separately or in conjunction with the providing of building data 406 to the given user device 116. Node data 408 may facilitate precision location determination by identifying potential devices within or external to the building 100 that can be utilized for real-time and precision location determination of the given user device 116 during an incident.

User Device Data 410

For at least one implementation, user device data 410 may include data that identifies the user device and is useful in establishing connections between the user device 116 and mesh system 300 devices. Non-limiting examples of the user device data 410 may include MAC addresses, wireless technologies supported, pairing protocols, pairing keys, security keys, location permissions, or the like.

User Data 412

For at least one implementation, user data 412 may include user specific data for a current user of the given user device 116. Non-limiting examples of such user specific data may include name, age, height, weight, medical conditions, biometric readings (when available) such as a heart rate, oxygen saturation rate, environmental readings such as current temperature, and the like. User data 412 may be communicated by the location engine 403(A) directly or indirectly to a responder device 126—such information may facilitate utilizations of responder resources based on current conditions being experienced by a given user. For example, a user in a hot and/or smoke filled area of a building may be prioritized for responder evacuation over a user in a less smokey area. Likewise, a user in a smoke filled area may receive egress instructions instructing the user to crawl on the floor along an egress route (so as to reduce smoke inhalation).

Communications Interface 414

For at least one implementation, a communications interface 414 may include one or more transponders configured for communicating wirelessly with one or more mesh nodes 102, local devices 108, other user devices 116, responder devices 126, and otherwise. Such communicative coupling may occur, directly or indirectly, using one or more antenna 416 that facilitate establishing and use of one or more UDMNCs, ULCs, and UURCs, as discussed above. The communications interface 414 may be communicatively coupled to and use communications links and technologies with non-limiting examples including GPS systems, biometric sensors, environmental sensors, and/otherwise. The communications interface 414 may be communicatively coupled to at least the processor 402 and may be communicatively coupled to one or more other user device components by a data bus 424.

The communications interface 414 may be configured to use any known or later arising communications and/or networking technologies which facilitate coupling of the user device 116 with other mesh system 300 components.

One or more data ports (not shown) (which are also commonly referred to an input/output interfaces, cards, or the like) may be used to facilitate coupling of the user device 116 with mesh system 300 components. Such communication interfaces are well-known in the art and non-limiting examples include Ethernet cards, USB and storage medium interface cards, radio frequency transceivers, and others.

Antenna 416

For at least one implementation, a user device 116 may be configured to include one or more antennas, transmitters, signal processors, decoders, encoders, encryptors, decryptors, communications standards, protocols, technologies, and the like (herein, "antenna") which facilitate the communication of data by and between a user device 116 with one or mesh system 300 components. Such antennas may use any known or later arising technologies.

Power Supply 418

For at least one implementation, a power supply 418 may include one or more batteries or other electrical energy storage devices. The power supply 418 may provide power to the user device components and external devices coupled thereto by a wired and/or inductive coupling.

User Interface 420

For at least one implementation, a user interface 420 may be communicatively coupled to one or more I/O devices 422 such as, but not limited to, augmented reality glasses, earbuds, speakers and/or other audible output devices, tactile signaling systems, such as those that vibrate or otherwise generate a human touch detectable signal, input devices, such as keypads, buttons, microphones, eye trackers, and otherwise. A user 115 may interact with a user device 116, via one or more I/O devices 422, in any manner, such as by speaking commands, selecting icons using buttons, touch pads, eye tracking, or otherwise. The user interface 420 may be configured for use with any known or later arising I/O device technologies.

I/O Devices 422

For at least one implementation, I/O device 422 may include any known or later arising human to device interface components, processes, and technologies. Non-limiting examples of interface components include audible input/output ("I/O") interfaces for use with audio I/O devices, visual I/O interfaces for use with visual I/O devices, and other I/O devices. An I/O devices 422 may be provided with the user device 116 or separately.

For at least one implementation, an audio I/O interface may support a receiving and/or presenting of audible content. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user.

An audio I/O interface generally includes hardware and computer instructions (herein, "audio technologies") which supports the input and output of audible signals between a user and a device. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided. For example, earbuds may be communicatively coupled to a smartphone, with the earbuds functioning as an audio I/O interface and capturing and presenting audio signals as sound waves to and from a user.

A visual I/O interface generally includes hardware and computer instructions (herein, "visible technologies") which supports the input by and output of visible signals to a user. Such visible technologies may include, but are not limited to, a camera (not shown), a user device display (not shown), and/or other devices and technologies for converting data into humanly perceptible information.

A visual I/O interface may be configured to use one or more visual I/O devices. A user device display (not shown) may be an internal display (not shown) and/or external display (not shown), that are configured to present visible data, and other data to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

Other forms of I/O devices may be provided with and/or coupled to the hub 115. Non-limiting examples include keypads, touch screens, styluses, external keyboards, or the like. Any form of known or later arising I/O device(s) may be utilized with a hub 122 for at least one implementation of the present disclosure.

For at least one implementation of the present disclosure, one or more of the location engine 403(A) and/or the egress engine 403(B) may be instantiated and the operations associated therewith performed by one or more processors, singularly, collectively, or otherwise, provided by the hub 122, one or more mesh nodes 102, one or more local devices 108, or otherwise. It is to be appreciated that the determining of a user device current location and the providing of egress route instructions may be provided in a user device standalone mode, a mesh system 300 distributed mode, or otherwise. Such providing of these operations may occur in view of processing and other capabilities of a given user device with some user devices, such as smartphones, providing greater independent processing capabilities and other devices, such as smart watches, providing less.

Figure 7:
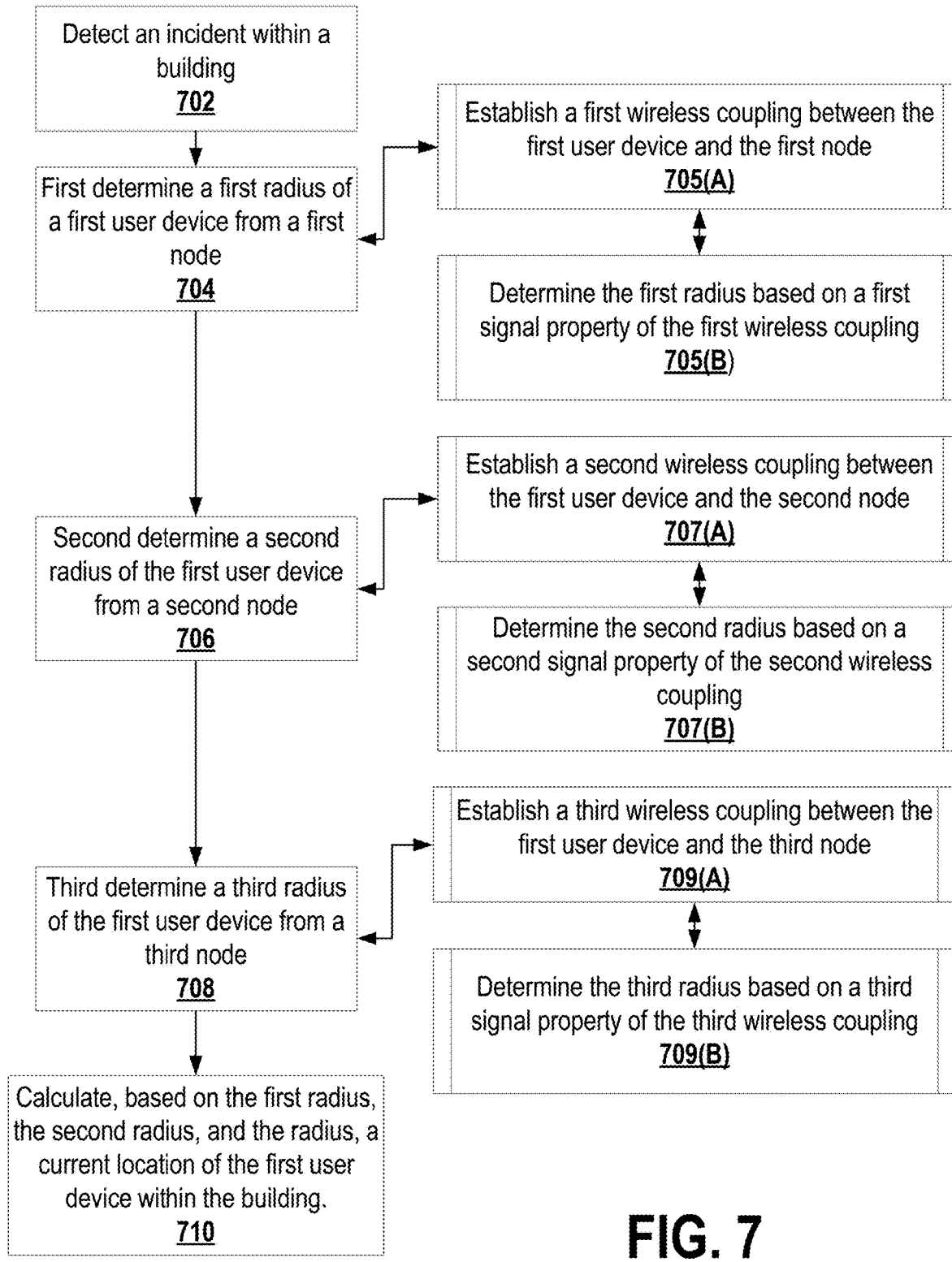
FIG. 7 is a flow chart illustrating a process for determining a current and precise location of a user device using a mesh communications system and in accordance with at least one implementation of the present disclosure.

Referring now to FIG. 7, a process for precision location determination of a user and the providing of one or more egress route portions 118 to a user device 116 is shown.

As per Operation 702, the process may be initiated when an incident is detected within a given building 100. The process may likewise be initiated when an incident is reported (e.g., by a responder informing a hub 122 to initiate an evacuation of a building in view of a bomb threat), imminent (e.g., when a tornado has been detected within a local area of the building), or otherwise.

As per Operation 704, the process may include first determining a first radius (or other distance) of a first user device from a first node. For at least one implementation, one or more of sub-operations 705(A) and 705(B) may be performed.

As per Sub-Operation 705(A), Operation 704 may include establishing a first wireless coupling between the first user device and the first node on the mesh system 300. For at least one implementation, the first wireless coupling may be a UDMNC, a UDLC, and/or a UURC. It is to be appreciated that Sub-Operation 705(A) may not be used when a wireless coupling already exists between the user device 116 and a node on the mesh system 300.

As per Sub-Operation 705(B), Operation 704 may include determining the first radius (or other distance) based on a first signal property of the first wireless coupling. As discussed above, any signal property which facilitates determining of a first distance of a user device from a first node may be used. For an implementation, one or more signal properties which facilitate determinations of the first distance and a first direction (e.g., a vector) between a user device and a first node.

As per Operation 706 and Sub-Operations 707(A) and 707(B), the process may include determining a second radius (or other distance) of the first user device from a second node. Such operations may include establishing a wireless coupling and determining one or more second signal properties of the second wireless coupling to determine a second distance and, for at least one implementation, a second distance and second direction of the user device from the second node.

As per Operation 708 and Sub-Operations 709(A) and 709(B), the process may include determining a third radius (or other distance) of the first user device from a third node. Such operations may include establishing a wireless coupling and determining one or more third signal properties of the third wireless coupling to determine a third distance and, for at least one implementation, a third distance and a third direction of the user device from the third node.

As per Operation 710, the process may include calculating based on the first radius, the second radius, and the third radius a current location of the user device 116 within the building 100 and relative to the one more nodes of a mesh system 300. It is to be appreciated that when distance and direction information is available, as per Operations 704, 706 and/or 708, the location of the user 116 within the building 100 may be precisely determined. Further as a number of wireless couplings between the user device 116 and additional "n+3" nodes of the mesh system 300 are established, precision location determinations of the user device 116 within the building 100 may occur. For at least one implementation, precision location determinations of the user device 116 within the building 100 as determined based on one or more signal properties of wireless couplings with multiple nodes of mesh system 300 may occur with three (3) or more such wireless coupling.

For at least one implementation, the nodes used in determining a precise location of a user device may be Wi-Fi mesh nodes and the one or more couplings of the user device with one or more such nodes may occur using Wi-Fi communications signals, BLUETOOTH signals, or otherwise.

For at least one implementation, a process may also include outputting one or more egress instructions to a user device based on their precision location determination using an implementation of the present disclosure. The one or more egress instructions may be dynamic and change as an incident location, incident type, or other real-time data relevant to an egress of a given user from a given building is available to one or more of the user device 116, a hub 122 for the mesh system 300, a responder device 126, or otherwise.

For at least one implementation, egress instructions may be communicated to a given user and/or a group of users by a node of the mesh system 300. For example, a mesh node 102 may include a speaker, directional arrows, or the like that facilitate the providing of egress instructions to users. Similarly, a local device 108 may include audible and/or visible display I/O devices which can be utilized to provide egress instructions to one or more users.

For at least one implementation, one or more of the location engine 403(A) and the egress engine 403(B) may be instantiated as a default application that is activated when an incident alert message is generated by a hub 122 for a given mesh system 300 and provided to two or more devices coupled to the given mesh system 300.

For an implementation, egress instructions may be provided to a user in view of user data 412. For example, user data 412 may indicate a primary language and egress instructions may be provided in such primary language.

For at least one implementation, when an incident is detected and one or more egress instructions are generated, a hub 122 may be configured to track the progress of users (as represented by their user device) along an egress route portion, the current location of the given user, and otherwise (herein, "egress progress information (EPI)"). The EPI may be provided to one or more user devices 116, responder devices 126, or otherwise. The EPI may be provided in any format, such as indications of users within a building by floorplan (for one or more floors), by tabular listings, or otherwise. The EPI may indicate which users are progressing (e.g., with a green blue), those whose progression have slowed (e.g., with a green color), and those whose progression has stopped (e.g., with a yellow color), and those in distress (e.g., with a red color). Such EPI may be useful by responders in prioritizing assistance to user in view of a given incident, as represented by incident data and other data.

Although various implementations have been described above with a degree of particularity, or with reference to one or more individual implementations, those skilled in the art could make numerous alterations to the disclosed implementations. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings may be interpreted as illustrative of implementations and not limiting. Changes in detail or structure may be made occur from the basic elements of the present disclosure as defined in the following claims.

What is claimed is:

1. A process, comprising:
    receiving, by a first user device, an alert upon a detecting of an incident within a building;
    first determining, by the first user device, a first radius of the first user device from a first node by:
        establishing, by the first user device, a first wireless coupling between the first user device and the first node; and
        determining, by the first user device, the first radius based on a first signal property of the first wireless coupling;
    second determining, by the first user device, a second radius of the first user device from a second node by:
        establishing, by the first user device, a second wireless coupling between the first user device and the second node; and
        determining, by the first user device, the second radius based on a second signal property of the second wireless coupling;
    third determining, by the first user device, a third radius of the first user device from a third node by:
        establishing, by the first user device, a third wireless coupling between the first user device and the third node; and
        determining, by the first user device, the third radius based on a third signal property of the second wireless coupling; and
    first calculating, by the first user device and based on the first radius, the second radius, and the third radius, a current location of the first user device within the building; and
    wherein the first signal property is a first time delay between one of:
        a first sending time and a first receipt time;
            wherein the first sending time indicates when the first node sent a first ranging signal to the first user device; and
            wherein the first receipt time indicates when the first user device received the first ranging signal; and
        a first reply time and a first reply receiving time;
            wherein the first reply time indicates when the first user device sent the first reply; and
    wherein the first reply receiving time indicates when the first node received the first reply.

2. The process of claim 1,
    wherein the first node is a first mesh node of a Wi-Fi mesh system;
    wherein the first wireless coupling is a Wi-Fi coupling; and
    wherein the first signal property further comprises a received signal strength, by the first user device, of the first wireless coupling.

3. The process of claim 2, further comprising:
    fourth determining, by the first user device, a fourth radius of the first user device from a first local device node by:
        establishing, by the first user device, a fourth wireless coupling between the first user device and the first local device node; and
            determining, by the first user device, the fourth radius based on a fourth signal property of the fourth wireless coupling;
                wherein the fourth wireless coupling is a BLUETOOTH™ coupling.

4. The process of claim 1,
    wherein the first node, the second node, and the third node are located within the building and coupled to a hub that is further coupled to at least one monitoring device configured to detect the incident.

5. The process of claim 1,
wherein the first node is a first mesh node of a Wi-Fi mesh system;
wherein the second node is a second mesh node of the Wi-Fi mesh system;
wherein the third node is a third mesh node of the Wi-Fi mesh system; and
wherein Wi-Fi communications signals are utilized for the first wireless coupling, the second wireless coupling, and the third wireless coupling.

6. The process of claim 1 further comprising:
generating, by the first user device, a first egress route portion based on the current location of the user device and an incident location; and
outputting, by the first user device, the first egress route portion in a humanly perceptible format and for presentation to a user of the first user device;
second, by the first user device, calculating a second location of the user device;
generating, by the first user device, a second egress portion based on the second location of the user device and the incident location; and
outputting, by the first user device, the second egress portion in a humanly perceptible format and for presentation to the user of the first user device.

7. The process of claim 6,
wherein the first egress route portion includes turn-by-turn directions for the user to progress from the current location to an egress location within the building.

8. The process of claim 6,
wherein the first egress route portion is generated, by the first user device, based on real-time data received from at least one monitoring device located within the building.

9. A user device comprising:
a processor;
a data store, coupled to the processor;
 wherein the data store non-transiently stores computer instructions, which upon execution by the processor, instantiate a location engine; and
a communication interface coupled to at least the processor;
wherein the location engine is instantiated when the processor receives an indication of an incident within a building; and
wherein, while the location engine is instantiated, the user device determines a current location of the user device within the building by:
 first determining a first signal property of a first Wi-Fi coupling established between the user device and a first mesh node;
 second determining a second signal property of a second Wi-Fi coupling established between the user device and a second mesh node; and
 third determining a third signal property of a third Wi-Fi coupling established between the user device and a third mesh node; and
 first calculating, based on the first signal property, the second signal property, and the third signal property, the current location of the user device within the building; and
wherein, collectively, the first mesh node, the second mesh node, and the third mesh node form a mesh system within the building; and
wherein the first signal property is a first time delay between one of:
 a first sending time and a first receipt time;
  wherein the first sending time indicates when the first node sent a first ranging signal to the first user device; and
  wherein the first receipt time indicates when the first user device received the first ranging signal; and
 a first reply time and a first reply receiving time;
  wherein the first reply time indicates when the first user device sent the first reply; and
wherein the first reply receiving time indicates when the first node received the first reply.

10. The user device of claim 9,
Wherein at least one of the second signal property and the third signal property is a received signal strength, by the user device, of the first Wi-Fi coupling.

11. The user device of claim 9,
wherein the user device further determines the current location of the user device within the building by:
 first determining a first distance of the user device from the first mesh node by:
  establishing the first Wi-Fi coupling between the user device and the first mesh node; and
  determining the first distance based on the first signal property of the first Wi-Fi coupling;
 second determining a second distance of the user device from the second mesh node by:
  establishing the second Wi-Fi coupling between the user device and the second mesh node; and
  determining the second distance based on the second signal property of the second Wi-Fi coupling;
 third determining a third distance of the user device from the third mesh node by:
  establishing the third wireless coupling between the user device and the third mesh node; and
  determining the third distance based on the third signal property of the third wireless coupling; and
 second calculating, based on the first distance, the second distance, and the third distance, the current location of the user device within the building.

12. The user device of claim 11,
wherein the first distance is a first radius of a first ranging signal transmitted by the first user device upon receiving the indication of the incident;
wherein the second distance is a second radius of a second ranging signal transmitted by the second mesh node upon the detection of the incident by the monitor;
wherein the third distance is a third radius of a third ranging signal transmitted by the third mesh node upon the detection of the incident by the monitor; and
wherein the first calculating of the current location further comprises triangulation of the first radius, the second radius, and the third radius.

13. The user device of claim 11,
wherein, while the location engine is instantiated, the user device further determines the current location of the user device within the building by:
 establishing a fourth wireless coupling between the user device and a local device coupled to the mesh system; and
 determining a fourth distance based on a fourth signal property of the fourth wireless coupling.

14. The user device of claim 13,
wherein the fourth wireless coupling is a BLUETOOTH™ coupling.

15. A user device comprising:
a processor;
a data store, coupled to the processor;
  wherein the data store non-transiently stores computer instructions, which upon execution by the processor, instantiate an egress engine; and
a communication interface coupled to at least the processor;
wherein the egress engine is instantiated when the processor receives an indication of an incident within a building; and
wherein, while the egress engine is instantiated, the user device determines a first egress route portion from a first user location for the user device within the building by:
  receiving first user location data from a location engine instantiated by the processor;
    wherein the first user location data is determined by the location engine based on first signal properties of Wi-Fi wireless couplings of the user device with at least three nodes of a Wi-Fi mesh system;
  receiving first real-time data including:
    a first incident location data identifying an incident location for an incident;
    a first incident type data for the incident;
    first building structural data; and
    a first egress location data identifying a first egress location; and
  determining the first egress route portion in view of the first user location data, the first incident location data, the first incident type data, the first building structural data, and the first egress location data; and
  wherein the first egress route portion avoids the incident location while providing an egress route from the first user location to the first egress location; and
wherein the first signal properties include a first time delay between one of:
  a first sending time and a first receipt time;
    wherein the first sending time indicates when the first node sent a first ranging signal to the first user device; and
    wherein the first receipt time indicates when the first user device received the first ranging signal; and
  a first reply time and a first reply receiving time;
    wherein the first reply time indicates when the first user device sent the first reply; and
    wherein the first reply receiving time indicates when the first node received the first reply.

16. The user device of claim 15,
wherein, while the egress engine is instantiated, the user device further determines a second egress route portion from a second user location to at least one of the first egress location and a second egress location when the incident has progressed from the incident location to a second incident location.

17. The user device of claim 15,
wherein the first egress route portion is provided to a responder device communicatively coupled to the Wi-Fi mesh system.

* * * * *